US012384576B2

(12) United States Patent
Sikora et al.

(10) Patent No.: US 12,384,576 B2
(45) Date of Patent: *Aug. 12, 2025

(54) EXTERNALLY-POWERED STRAPPING TOOL AND A STRAPPING TOOL ASSEMBLY UTILIZED THEREIN

(71) Applicant: Golden Bear LLC, Columbus, OH (US)

(72) Inventors: Joshua Robert Sikora, Columbus, OH (US); Stephen William Sikora, Columbus, OH (US); Charles Russell Patzer, Columbus, OH (US)

(73) Assignee: Golden Bear LLC, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,959

(22) Filed: Feb. 3, 2024

(65) Prior Publication Data

US 2024/0174394 A1 May 30, 2024

Related U.S. Application Data

(60) Continuation of application No. 17/994,496, filed on Nov. 28, 2022, now Pat. No. 11,891,199, which is a (Continued)

(51) Int. Cl.

| | |
|---|---|
| ***B65B 13/22*** | (2006.01) |
| ***B25F 3/00*** | (2006.01) |

(Continued)

(52) U.S. Cl.

CPC .............. *B65B 13/025* (2013.01); *B25F 3/00* (2013.01); *B65B 13/027* (2013.01); *B65B 13/22* (2013.01); *B65B 13/327* (2013.01)

(58) Field of Classification Search

CPC ..... B65B 13/02; B65B 13/025; B65B 13/027; B65B 13/18; B65B 13/187; B65B 13/22;

(Continued)

(56) References Cited

U.S. PATENT DOCUMENTS

| | | | |
|---|---|---|---|
| 3,028,885 | A | 4/1962 | Leslie et al. |
| RE26,114 | E | 11/1966 | Leslie et al. |

(Continued)

FOREIGN PATENT DOCUMENTS

| | | | |
|---|---|---|---|
| EP | 1338513 | A1 | 8/2003 |
| GB | 2385294 | B | 6/2005 |

(Continued)

OTHER PUBLICATIONS

PCT Form 210, International Search Report for PCT/US2013/049489, mailed on Apr. 10, 2014.

(Continued)

*Primary Examiner* — Jimmy T Nguyen

(74) *Attorney, Agent, or Firm* — The Law Office of Patrick F. O'Reilly III, LLC

(57) ABSTRACT

An externally-powered strapping tool that includes a strapping tool assembly configured to perform one or more strapping operations; and an external power source operatively coupled thereto, the external power source being attached to the strapping tool assembly in a substantially immovable manner. According to another aspect, a strapping tool assembly includes one or more strapping tool subassemblies configured to perform one or more strapping operations; a power transfer subassembly operatively coupled to the one or more strapping tool subassemblies, the power transfer subassembly configured to transfer motive power from the external power source to the one or more strapping tool subassemblies; and the external power source (Continued)

including a power generation portion and a first handle portion extending from the power generation portion.

10 Claims, 30 Drawing Sheets

Related U.S. Application Data continuation of application No. 17/063,312, filed on Oct. 5, 2020, now Pat. No. 11,511,893, which is a continuation of application No. 15/785,119, filed on Oct. 16, 2017, now Pat. No. 10,793,303, which is a division of application No. 13/936,068, filed on Jul. 5, 2013, now Pat. No. 9,789,984.

(60) Provisional application No. 61/668,406, filed on Jul. 5, 2012.

(51) Int. Cl.
*B65B 13/02* (2006.01)
*B65B 13/32* (2006.01)

(58) Field of Classification Search
CPC ..... B65B 13/32; B65B 13/322; B65B 13/327; B25F 3/00
USPC ...................................................... 100/29, 32
See application file for complete search history.

(56) References Cited

U.S. PATENT DOCUMENTS 4,280,578 A 7/1981 Perkins
4,934,416 A 6/1990 Tonkiss
5,163,482 A 11/1992 Wolcott
5,509,206 A 4/1996 Rowe et al.
5,595,220 A 1/1997 Leban et al.
6,073,664 A * 6/2000 Angarola ................ B65B 13/22 140/93.2
6,601,616 B1 8/2003 Lenox
6,705,597 B1 3/2004 Reilly et al.
7,059,588 B2 6/2006 Goulet
7,374,124 B2 5/2008 Engelsher
7,410,336 B2 8/2008 Parks
7,588,109 B2 9/2009 Wachendorf et al.
8,561,531 B2 10/2013 Rooth
9,085,070 B2 7/2015 Skonieczy, Jr. et al.
9,789,984 B2 * 10/2017 Sikora ................... B65B 13/025
10,793,303 B2 * 10/2020 Sikora ..................... B65B 13/22
11,511,893 B2 * 11/2022 Sikora ................... B65B 13/027
11,891,199 B2 * 2/2024 Sikora ..................... B65B 13/22
2004/0007701 A1 1/2004 Goulet
2006/0166800 A1 7/2006 Murphy
2007/0145179 A1 6/2007 Engelsher
2008/0092981 A1 * 4/2008 Hillegonds ........... B65B 13/027 140/93.4
2009/0071350 A1 3/2009 Fay
2010/0139805 A1 6/2010 Sledzinski
2011/0056390 A1 3/2011 Neeser et al.
2011/0056391 A1 3/2011 Neeser et al.
2012/0060703 A1 3/2012 Stiefvater et al.
2013/0085053 A1 4/2013 Figiel et al.
2013/0269824 A1 10/2013 Skonieczny, Jr. et al.

FOREIGN PATENT DOCUMENTS

JP 2008127174 A 6/2008
SU 155753 A1 12/1963
WO WO-8400023 A1 * 1/1984 ........... B65B 13/345
WO 2010136530 A2 12/2010
WO 2012037271 A1 3/2012

OTHER PUBLICATIONS

PCT Form 237, Written Opinion of the International Searching Authority for PCT/US2013/049489, mailed on Apr. 10, 2014.
First office action on the merits (Non-Final Rejection) in U.S. Appl. No. 13/936,068, mailed on Mar. 2, 2016.
Second office action on the merits (Non-Final Rejection) in U.S. Appl. No. 13/936,068, mailed on Oct. 14, 2016.
Third office action on the merits (Non-Final Rejection) in U.S. Appl. No. 13/936,068, mailed on Feb. 23, 2017.
Midwest Industrial Packaging, MIP-GRIP-1141 battery powered tensioner. Copyright 2014.
PAC Strapping Products Inc., Plastic Strapping Tools VT550L and VT700L. Copyright 2011.
Signode, BXT2-19 Battery Powered Combination Tool. Copyright 2015.
Signode, BXT2-25/32 Battery Powered Combination Tool. Copyright 2015.
First office action on the merits (Non-Final Rejection) in U.S. Appl. No. 15/785,119, mailed on Nov. 27, 2019.
First office action on the merits (Non-Final Rejection) in U.S. Appl. No. 17/063,312, mailed on Apr. 12, 2022.
First office action on the merits (Non-Final Rejection) in U.S. Appl. No. 17/994,496, mailed on May 4, 2023.

* cited by examiner

SECTION A-A

SECTION B-B

SECTION A-A

SECTION B-B

SECTION C-C

EXTERNALLY-POWERED STRAPPING TOOL AND A STRAPPING TOOL ASSEMBLY UTILIZED THEREIN

CROSS-REFERENCE TO RELATED APPLICATIONS

This is a continuation of U.S. patent application Ser. No. 17/994,496, entitled "Externally-Powered Strapping Tool And A Strapping Tool Assembly Utilized Therein", filed on Nov. 28, 2022; which is a continuation of U.S. patent application Ser. No. 17/063,312, entitled "Externally-Powered Strapping Tool And A Strapping Tool Assembly Utilized Therein", filed on Oct. 5, 2020, now U.S. Pat. No. 11,511,893; which is a continuation of U.S. patent application Ser. No. 15/785,119, entitled "Externally-Powered Strapping Tool And A Strapping Tool Assembly Utilized Therein", filed on Oct. 16, 2017, now U.S. Pat. No. 10,793,303; which is a divisional of U.S. patent application Ser. No. 13/936,068, entitled "Externally-Powered Strapping Tool And A Strapping Tool Assembly Utilized Therein", filed on Jul. 5, 2013, now U.S. Pat. No. 9,789,984; which claims priority to U.S. Provisional Patent Application No. 61/668,406, entitled "Externally-Powered Strapping Tool", filed on Jul. 5, 2012, the disclosure of each of which is hereby incorporated by reference as if set forth in their entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to externally-powered strapping or packaging tools. More particularly, the invention relates to an externally-powered strapping or packaging tool that includes a strapping tool subassembly powered by an external power source.

2. Background and Related Art

Various tools are known in the packaging art for performing numerous functions related to the manipulation of strapping, which is commonly used as a closing mechanism for packages, and as a convenient means for easily attaching two objects to one another (e.g., attaching a box to a pallet). Some of these conventional tools are powered directly from a centralized system, such as a building electrical system or a central pneumatic system. Other conventional packaging tools have a power supply that is an integral part of the tool. Both of the aforementioned types of conventional packaging tools have numerous limitations and drawbacks. The tools powered directly from a centralized system are not readily portable, and are rendered inoperable if the centralized system experiences an outage. While the packaging tools containing an integral power source are more portable, they have other significant limitations and drawbacks. For example, if there is a problem with the power source in one of these tools, the entire tool is rendered inoperable until the power source is repaired or replaced. Moreover, these tools are only designed to be powered by one particular power source, and thus, do not offer the user the flexibility to interchange the power sources if desired or required.

Therefore, what is needed is a packaging tool that incorporates an external power source that is both portable and interchangeable, thereby greatly facilitating the replacement of the power source if required. A need also exists for a packaging tool that can be alternatively powered by different external power sources. Moreover, there is a need for a packaging tool that is powered by an external power source that is durable, reliable, sufficiently light, and both quick and easy to swap out. Furthermore, there is a need for a packaging tool that is powered by an external power source that is compact and properly balanced with respect to the remainder of the tool.

BRIEF SUMMARY OF EMBODIMENTS OF THE INVENTION

Accordingly, the present invention is directed to an externally-powered strapping tool that substantially obviates one or more problems resulting from the limitations and deficiencies of the related art.

In accordance with one aspect of one or more embodiments of the present invention, there is provided an externally-powered strapping tool that includes a strapping tool assembly configured to perform one or more strapping operations; and an external power source operatively coupled to the strapping tool assembly, the external power source being attached to the strapping tool assembly in a substantially immovable manner.

In accordance with another aspect of one or more embodiments of the present invention, there is provided a strapping tool assembly configured to be operatively coupled to an external power source, which includes: one or more strapping tool subassemblies configured to perform one or more strapping operations; a power transfer subassembly operatively coupled to the one or more strapping tool subassemblies, the power transfer subassembly configured to transfer motive power from the external power source to the one or more strapping tool subassemblies; and attachment means configured to releasably attach the strapping tool assembly to the external power source, the attachment means further configured to hold the external power source in a substantially fixed position relative to the strapping tool assembly when the attachment means are in an engaged state.

In accordance with yet another aspect of one or more embodiments of the present invention, there is provided a strapping tool assembly configured to be operatively coupled to an external power source, which includes: one or more strapping tool subassemblies configured to perform one or more strapping operations; a power transfer subassembly operatively coupled to the one or more strapping tool subassemblies, the power transfer subassembly configured to transfer motive power from the external power source to the one or more strapping tool subassemblies; and attachment means configured to releasably attach the strapping tool assembly to the external power source, the attachment means further configured to hold the external power source in a substantially fixed position relative to the strapping tool assembly when the attachment means is in an engaged state.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

A first embodiment of an externally-powered strapping tool is illustrated in FIGS. 1-7. In the first embodiment, the externally-powered strapping tool is in the form of a windlass tensioner 50 for tightening a strap around a package or other object. The externally-powered windlass tensioner of the first embodiment generally comprises a strapping tool assembly (i.e., windlass tensioner assembly) that is operatively coupled to an external power source (i.e., battery-powered drill 16). In particular, the first illustrated embodiment depicts an 18-volt cord strap tensioner. While the external power source of the first embodiment is in the form of a battery-powered drill 16, those of ordinary skill in the art will appreciate that other suitable external power sources may be substituted for the drill 16. For example, an alternative external power source in the form of a 120 volt AC drill or pneumatic drill could be used. Also, a suitable circular saw or grinder could be used to power the windlass tensioner assembly. In general, the external power required to drive the strap tensioning tool could be supplied by a variety of different sources including, but not limited to, battery, air, alternating-current (AC) electricity, hydraulic or fluid power.

Figure 1:
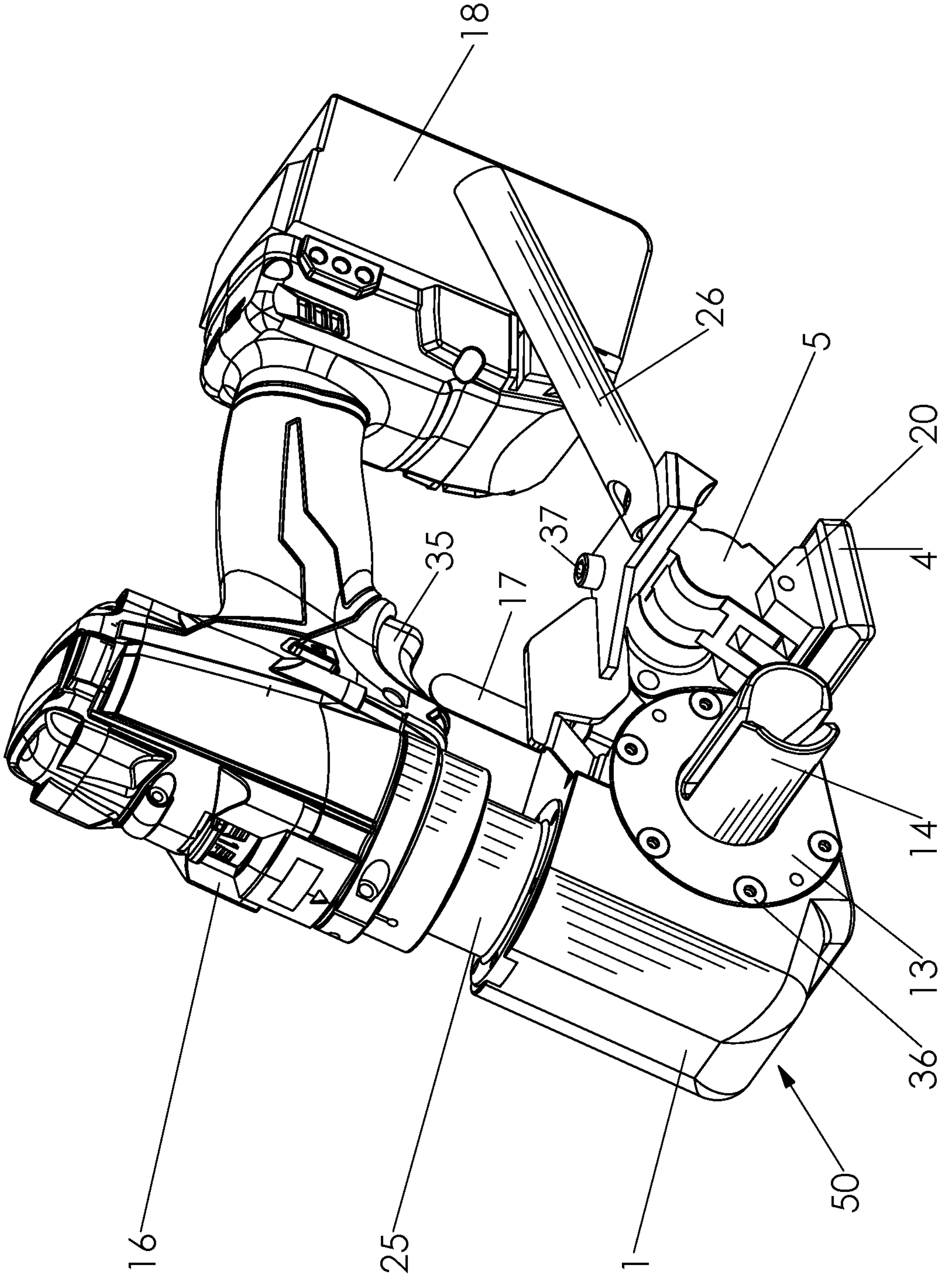
FIG. 1 is a first frontal perspective view of an externally-powered strapping tool according to a first embodiment of the invention.
Figure 2:
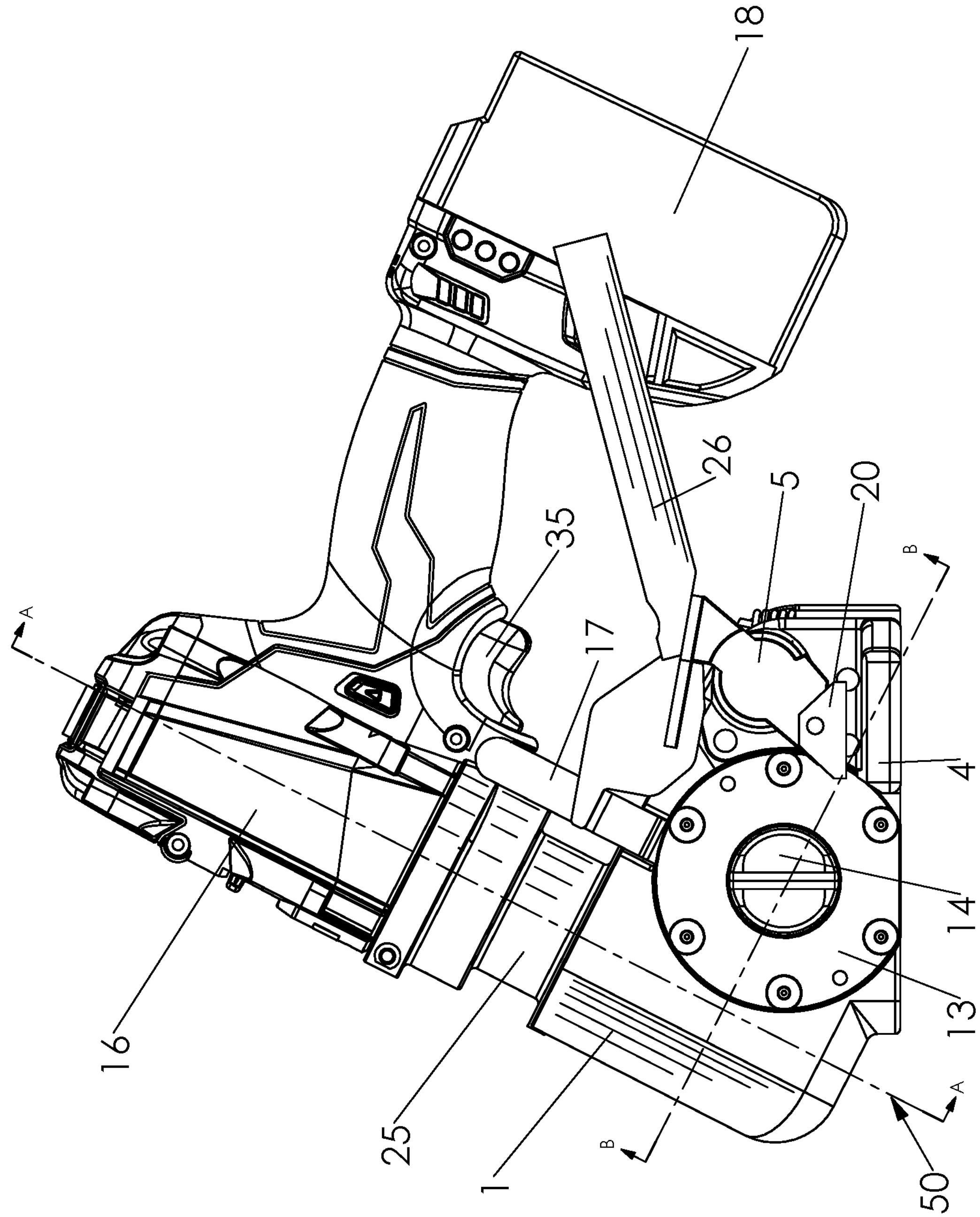
FIG. 2 is a front view of the externally-powered strapping tool according to the first embodiment of the invention.
Figure 3:
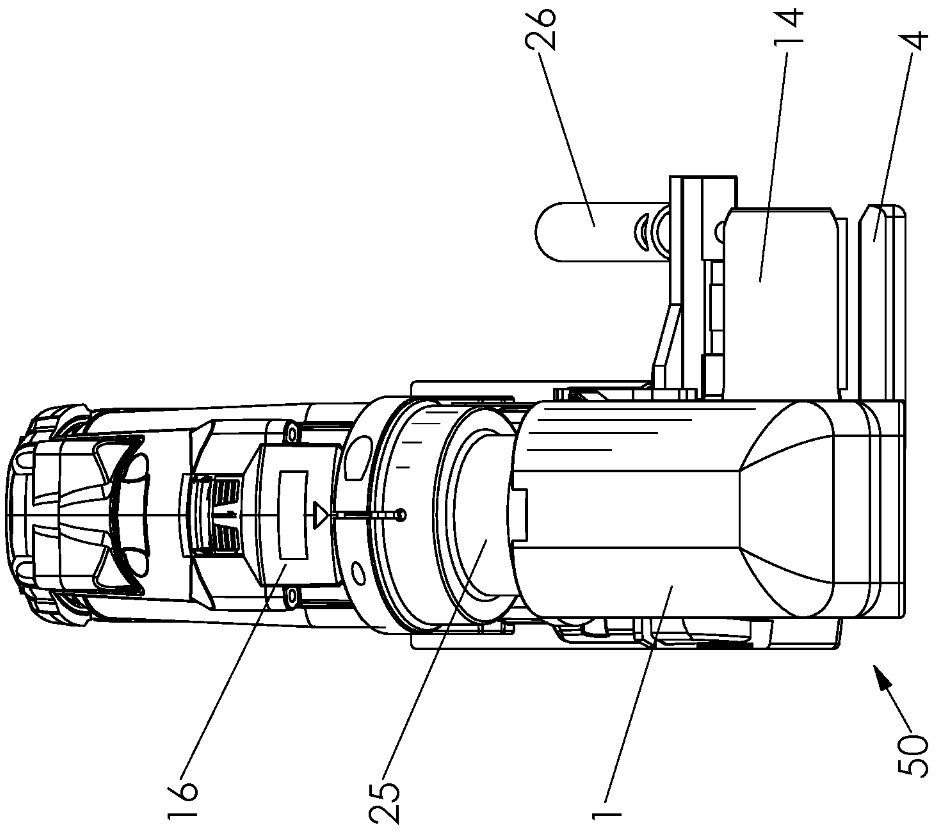
FIG. 3 is a top perspective view of the externally-powered strapping tool according to the first embodiment of the invention.
Figure 4:
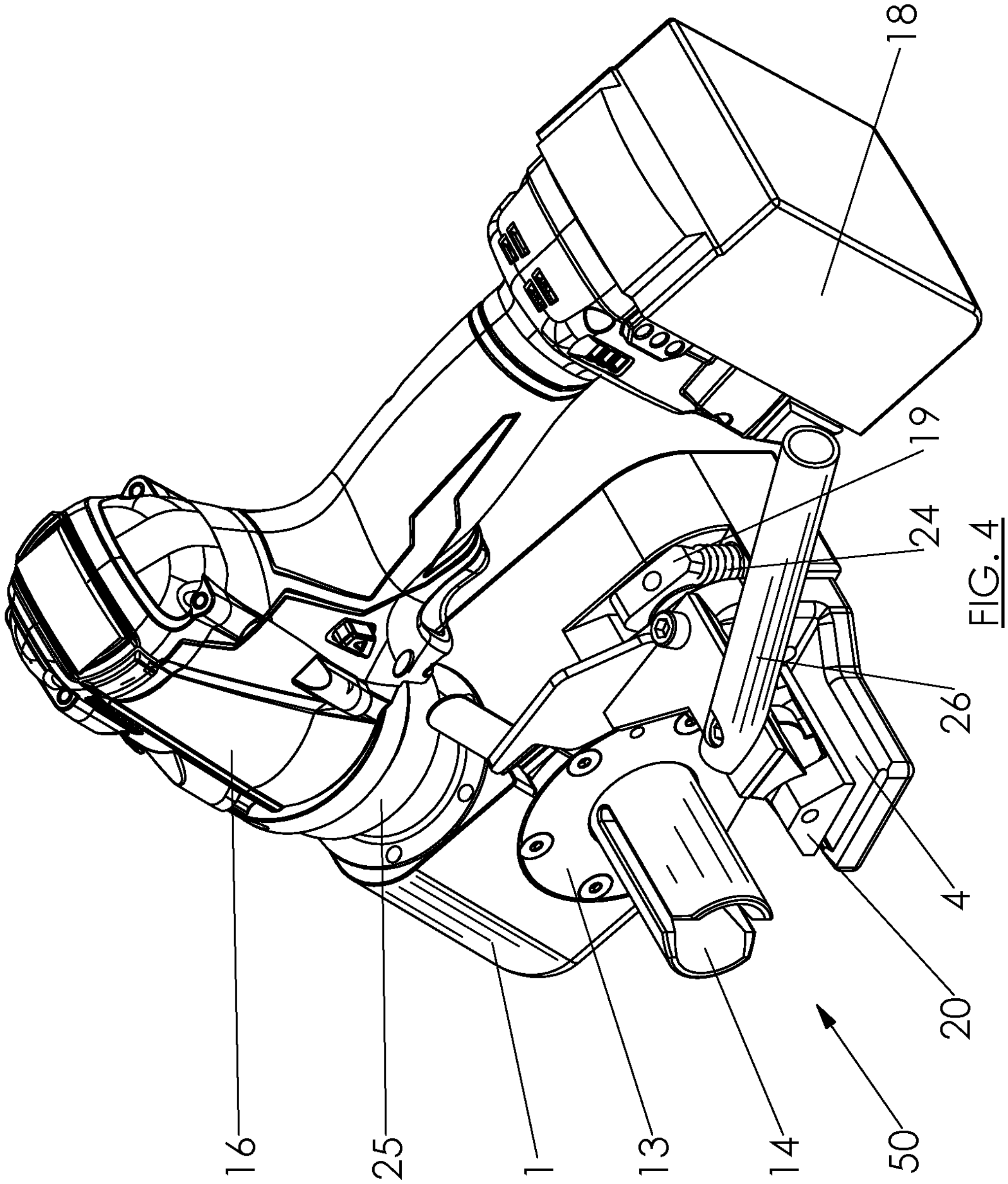
FIG. 4 is a second frontal perspective view of the externally-powered strapping tool according to the first embodiment of the invention, wherein the strapping tool is viewed from a different angle.

As best shown in FIGS. 1, 2, and 4, the external power source of the first embodiment comprises a drill 16 that is powered by a battery pack 18 (e.g., an 18-volt lithium battery pack). For example, suitable battery-powered drills that could be used for drill 16 are Milwaukee® M18 Fuel Series drill model nos. 2601-20, 2610-20, 2601-22, and 2610-24. The battery-powered drill 16 is operatively coupled to the windlass tensioner assembly by means of a transition coupling 25 (i.e., attachment means). The transition coupling 25 prevents the drill 16 from twisting relative to the windlass tensioner assembly. Referring to FIG. 2, it can be seen that the external power source (i.e., battery-powered drill 16) is attached to the strapping tool assembly at a predetermined acute angle that is configured to facilitate the efficiency and ergonomic characteristics of said strapping tool. In another embodiment, the external power source (i.e., battery-powered drill 16) can be attached to the strapping tool assembly at an acute angle lying in the range from approximately 60 degrees to approximately 80 degrees (or in the range from 60 degrees to 80 degrees). A pin-hold-down subassembly 30, 31 (see FIGS. 5 and 7) also facilitates the coupling of the drill 16 to the windlass tensioner assembly. As illustrated in these figures, the pin-hold-down subassembly 30, 31 comprises a pin hold down component 30 and a spring 31. Component 30 is a small washer that holds down a plurality of pins in the drill 16. The spring 31 applies a spring force to the washer component 30 to hold down the pins in the drill 16. By adjusting the compression of the spring 31, the drill 16 slips over the pins at different torque values, which gives adjustable torque on the drill 16. In the illustrated embodiment of the windlass tensioner 50, there is no torque adjustment. The stiffness of the spring 31 is selected such that the pins are held in all of the time so as to result in the production of maximum torque at all times of operations (e.g., 2700 inch-pounds of torque). In alternative embodiments, a rigid connection could be used to hold the pins of the drill 16 in place.

Figure 5:
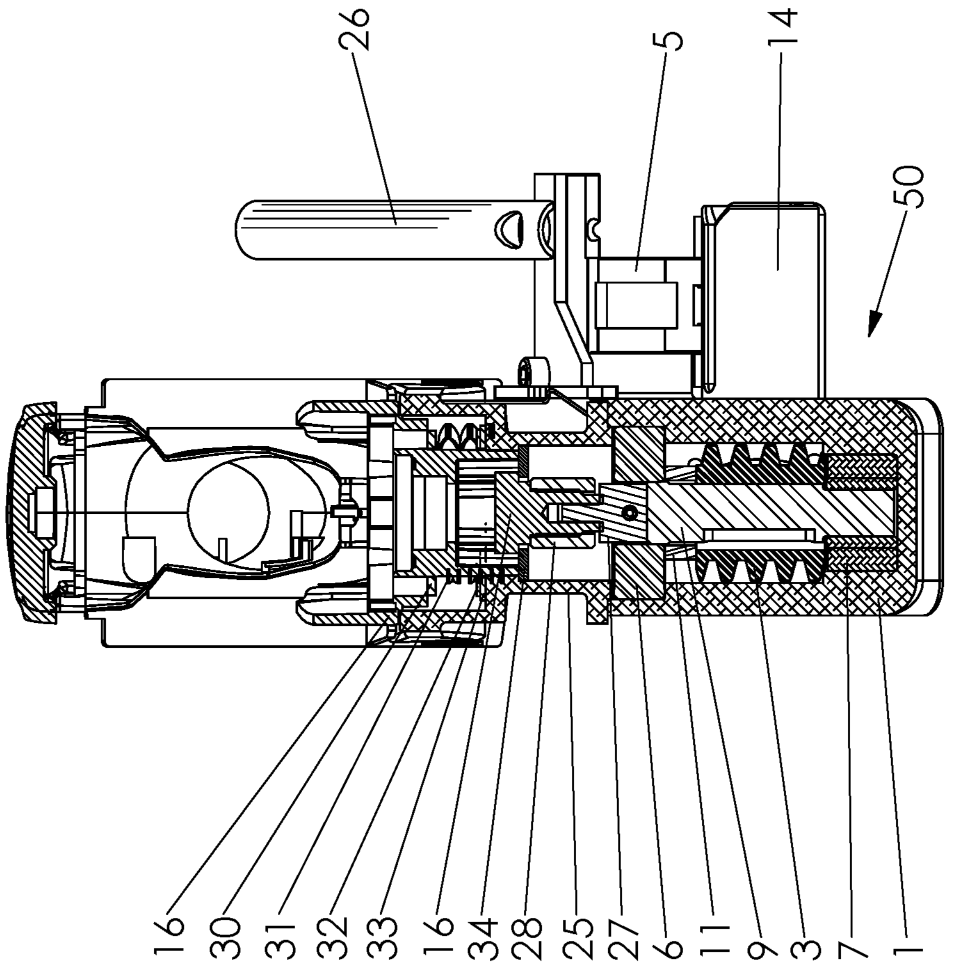
FIG. 5 is a longitudinal sectional view of the externally-powered strapping tool according to the first embodiment of the invention, which is cut along the cutting-plane line A-A in FIG. 2.
Figure 7:
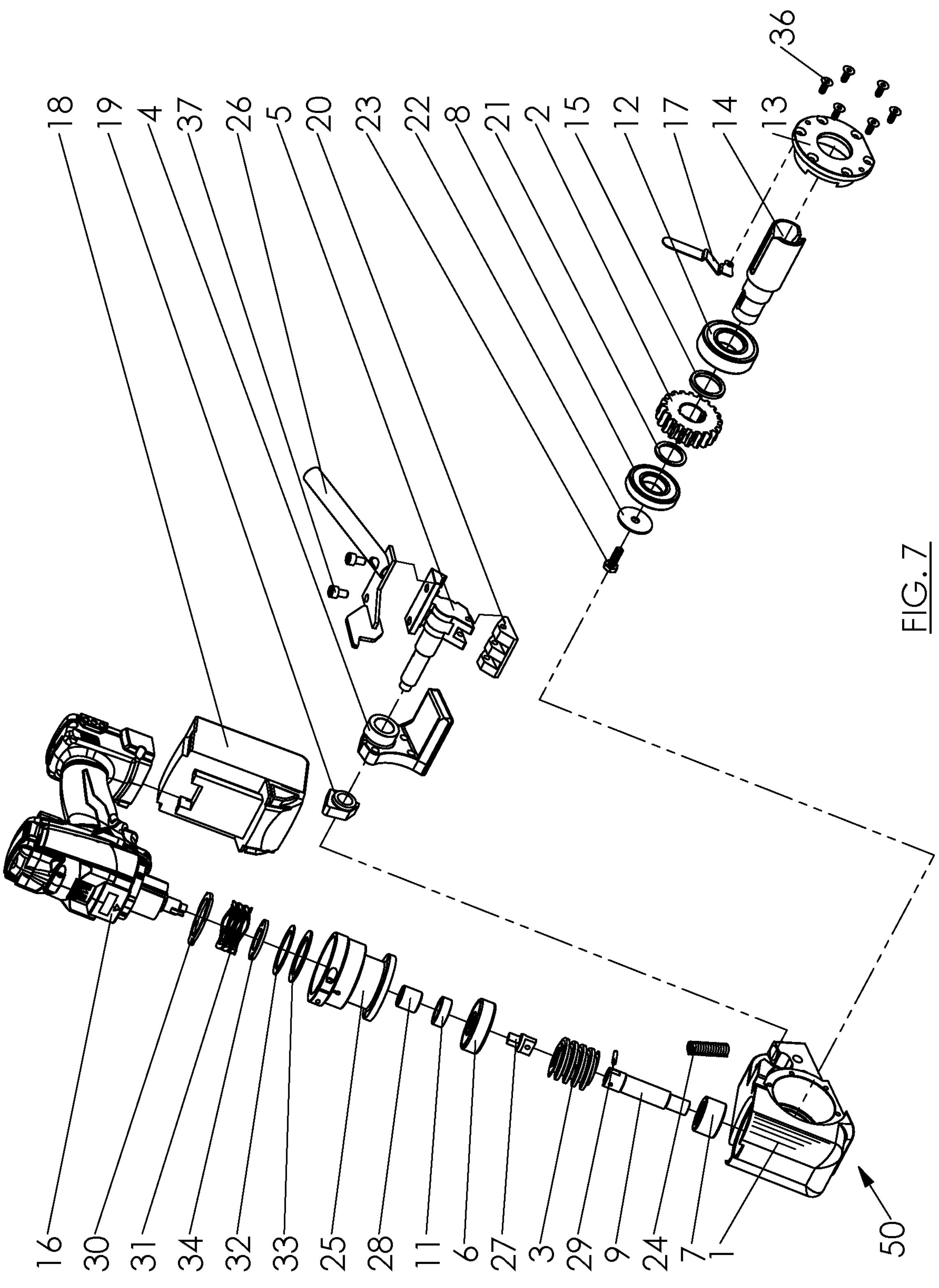
FIG. 7 is an exploded perspective view of the externally-powered strapping tool according to the first embodiment of the invention.

Also, referring to FIGS. 5 and 7, it can be seen that a plurality of annular spacers 32, 33 are disposed between the spring 31 and a collar portion of the drill 16. The spacers 32, 33 enable the amount of preloading on the spring 31 to be adjusted which, in turn, enables the amount of torque on the drill 16 to be adjusted (i.e., the amount of torque that the drill can create before it slips). In essence, spacers 32, 33 act as “shims” for the assembly. In FIG. 5, it can be seen that the clamp holder 34 affixes the transition coupling 25 and its internal components 30, 31, 32 to the drill 16. During assembly, the internal components 30, 31, 32 are initially inserted into the transition coupling 25. Then, the transition coupling 25 is secured to the drill 16 with fasteners (e.g., screws) passing through apertures in clamp holder 34. As the fasteners passing through apertures in clamp holder 34 are tightened, the spring 31 is compressed. Once these components are assembled, an additional external screw is provided on transition coupling 25 that secures it to the drill 16. After which, the transition coupling 25 and its internal components are attached to the worm shaft 9 by means of drive coupling member 27, and the assembly is screwed to the gear case housing 1 with a plurality of fasteners passing through the peripheral flanged end of transition coupling 25 (i.e., a plurality of fasteners disposed in a ring-like arrangement).

Now, turning to the sectional views of FIGS. 5 and 6, as well as the exploded view of FIG. 7, the internal components of the windlass tensioner assembly will be described in detail. First, as best illustrated in the sectional view of FIG. 5, it can be seen that the drive shaft of the drill 16 is operatively coupled to the worm shaft 9 by mean of a drive coupling member 27. As shown in FIGS. 5 and 7, a roll pin 29 is used to attach the worm shaft 29 to the drive coupling member 27. As best shown in FIGS. 5 and 7, the tip of the drill drive shaft has a slot disposed therein. The slot in the drill drive shaft engages the top portion of the drive coupling member 27 to transfer torque into the strapping tool assembly. The drive coupling member 27 allows for some misalignment between the strapping tool assembly and the drill 16. As best shown in FIG. 5, the coupling keeper 28 circumscribes the connection between the tip of the drill drive shaft and the top portion of the drive coupling member 27, namely it screws onto the drill tip so as to strengthen the connection between the tip of the drill drive shaft and the top portion of the drive coupling member 27 and ensure that requisite amount of torque is transferred therebetween. Rather than using the drive coupling member 27, in another embodiment of the invention, the drive shaft of the drill 16 and the worm shaft 9 could be provided with threads that matingly engage with one another.

Referring again to FIG. 5, it can be seen that the worm shaft 9 is operatively connected to the worm 3. More specifically, the worm 3 is configured to rotate with the worm shaft 9, and relative rotation between the two components 3, 9 is effectively prevented by a keystock member. In order to facilitate the free rotation of the worm shaft 9, and to reduce friction, the upper end of the worm shaft 9 is provided with an angular contact bearing 6 disposed around the outer circumference thereof (refer to FIGS. 5 and 7). Similarly, the lower end of the worm shaft 9 is provided with a needle-type bearing 7 disposed around its outer circumference. Also, as depicted in FIG. 5, it can be seen that a worm shaft spacer 11 is disposed between the top of the worm 3 and the bottom of the angular contact bearing 6. The worm shaft spacer 11 helps to maintain the proper axial placement of the worm 3 in the windlass tensioner assembly.

Figure 6:
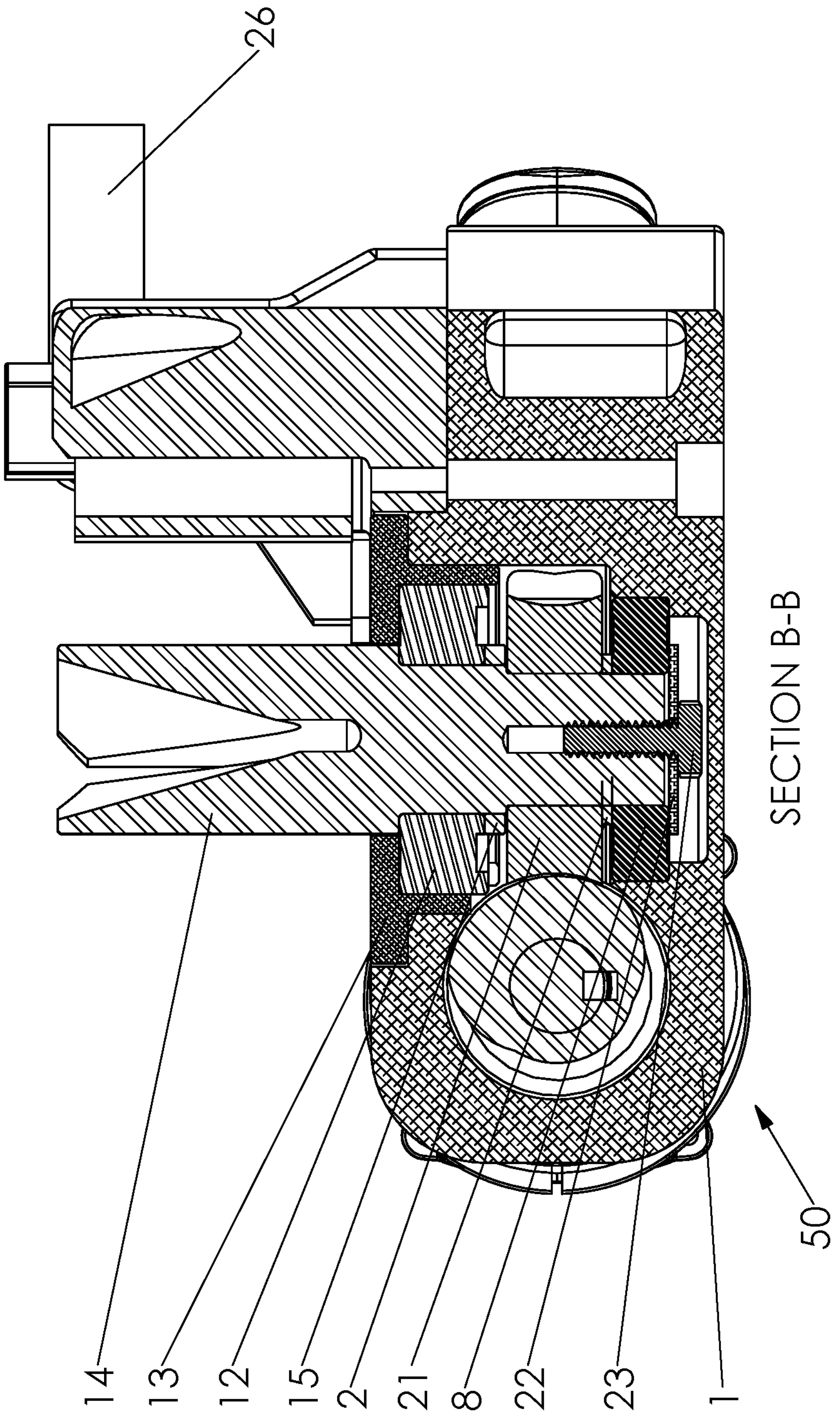
FIG. 6 is a sectional view of the strapping tool assembly of the externally-powered strapping tool according to the first embodiment of the invention, which is cut along the cutting-plane line B-B in FIG. 2.

The generally helical threads on the worm 3 matingly engage with the teeth disposed about the circumference of the worm gear 2 (see FIGS. 6 and 7). As most clearly depicted in the sectional view of FIG. 6, the worm gear 2 is operatively connected to the slotted main shaft 14 of the windlass tensioner assembly. More particularly, the slotted main shaft 14 is configured to rotate with the worm gear 2, and relative rotation between the two components 2, 14 is effectively prevented by keystock member(s). As best shown in FIGS. 6 and 7, the rotational axis of worm 3 and worm shaft 9 is disposed generally perpendicular with respect to the rotational axis of the worm gear 2 and the slotted main shaft 14. In order to facilitate the free rotation of the slotted main shaft 14, and to reduce friction, the right end of the main shaft 14 is provided with a ball-type bearing 8 disposed around the outer circumference thereof (refer to FIG. 6). Similarly, a middle portion of the main shaft 14 is provided with a roller bearing 12 disposed around its outer circumference. Also, as depicted in FIG. 6, it can be seen that main shaft spacers 15, 21 are disposed on opposed sides of the worm gear 2. Specifically, the main shaft spacer 15 is disposed between the roller bearing 12 and the left side of the worm gear 2, whereas the main shaft spacer 21 is disposed between the right side of the worm gear 2 and the ball-type bearing 8. The main shaft spacers 15, 21 help to maintain the proper axial placement of the worm gear 2 in the windlass tensioner assembly. In order to hold the main shaft 14 in place within the windlass tensioner assembly, a large diameter, flat washer 22 is affixed to the right end of the main shaft 14 by means of a locking screw 23.

As depicted in FIGS. 5 and 7, the aforedescribed internal components of the windlass tensioner assembly are housed within a gear case 1. A side plate 13, which circumscribes the main shaft 14, holds the components 2, 3, 8, 9, 12, 14, 15, 21 in place within the case 1. Referring to FIG. 1, it can be seen that the side plate 13 is preferably affixed to the front of the case 1 by means of six (6) tapered head cap screws 36. While a total of six (6) screws 36 are utilized in the illustrated embodiment, those of ordinary skill in the art will readily appreciate that any suitable type or quantity of fasteners may be used, provided that the fasteners are capable of securely affixing the side plate 13 to the case 1.

Next, the foot subassembly of the windlass tensioner assembly will be described with reference to FIGS. 1, 2, 4, 5, and 7. Beginning with FIG. 1, it can be seen that the foot subassembly comprises a foot 20 which is attached to a weldment lock handle 26 by means of a leg and shaft 5. As illustrated in FIGS. 1 and 7, a foot plate 4 is disposed underneath the foot 20. Preferably, the foot plate 4 and associated mounting bracket is affixed to a front portion of the case 1 by means of a plurality of fasteners (e.g., button head cap screws), while the weldment lock handle 26 is affixed to the generally flat, top portion of the leg and shaft subassembly 5 by a plurality of machine screws 37 (e.g., two (2) screws as illustrated in FIG. 7).

When the windlass tensioner is used for applying tension to a strap, the strap is sandwiched between the bottom surface of the foot 20 and the top surface of the foot plate 4. The foot leg and shaft 5 are held in place by a lift release retainer 19. A spring 24, which is disposed within a cylindrical cavity of the case 1, applies an upward force on the lift release retainer 19 in order to hold the foot 20 against the top surface of the strap (see FIGS. 4 and 7). After the requisite tension has been applied to the strap being tightened, the weldment lock handle 26 can be used to lift up the foot 20 so that the strap can be removed from the windlass tensioner assembly. The thumb release 17 acts as a spring that latches when the handle 26 is lifted up. The thumb release 17 holds the handle 26 in the "up" position so as to make it easy to load the strap. Once the strap is loaded under the foot 20, the user or operator of the windlass tensioner 50 simply uses his or her thumb to press thumb release 17 which, in turn, releases the foot 20 down onto the strap to hold it down.

In an exemplary embodiment, the windlass tensioner has an overall length of approximately 12.5 inches, a width of approximately 5.1 inches, and a height of approximately 9.6 inches. Although, it is to be understood that the invention is in no way limited to these particular dimensions. Rather, the invention may be practiced using other suitable dimensions without departing from the spirit and scope of the appended claims.

Now, referring to FIGS. 1-7, the operation of the windlass tensioner of the first embodiment will be described in detail. Initially, a cord strap of one of a number of sizes is looped around the package that requires the restraint. Then, the user threads the ends of the strap through a buckle. The configuration of the buckle allows the strap to slide through the buckle unrestrained in one direction and allows no motion the other way. Next, the windlass tensioner tool is placed on the bottom leg of the strap from the buckle and the holding foot 20 is lowered. The foot 20 prevents the tool from creeping forward as the windlass is tensioned. The upper strap from the buckle is threaded through the tensioning slot in the main shaft 14 of the windlass tensioner assembly. The revolving shaft 14 on the windlass tensioner assembly supplies the tension to the strap as it rotated. The tool is activated and the windlass is turned by squeezing the trigger 35 of the drill 16. When the proper tension is attained, the trigger 35 of the drill 16 is released or the tool stalls out as required. The foot 20 is lifted and the tool tension is released. After which, the strap is unwound from the windlass tensioner assembly.

If additional tension is required, the tool needs to be reactivated. This may happen in a number of ways—one of which is, to reapply the foot 20 and rethread the windlass, and resqueeze the trigger 35 of the drill 16 so as to apply more tension. Upon accomplishment of the proper tension, the tool 50 is removed from the package and the operation is complete.

A second embodiment 100 of an externally-powered strapping tool is illustrated in FIGS. 8-14. In the second embodiment, like the first embodiment, the externally-powered strapping tool is in the form of a windlass tensioner for tightening a strap around a package or other object. Also, like the first embodiment, the externally-powered windlass tensioner of the second embodiment generally comprises a strapping tool assembly (i.e., windlass tensioner assembly) that is operatively coupled to an external power source (i.e., battery-powered drill 119). However, unlike the first illustrated embodiment, the second illustrated embodiment 100 depicts a 12-volt cord strap tensioner. As described above with regard to the first embodiment, while the external power source of the second embodiment is in the form of a battery-powered drill 119, those of ordinary skill in the art will appreciate that other suitable external power sources may be substituted for the drill 119 (see examples described above in the first embodiment).

Figure 8:
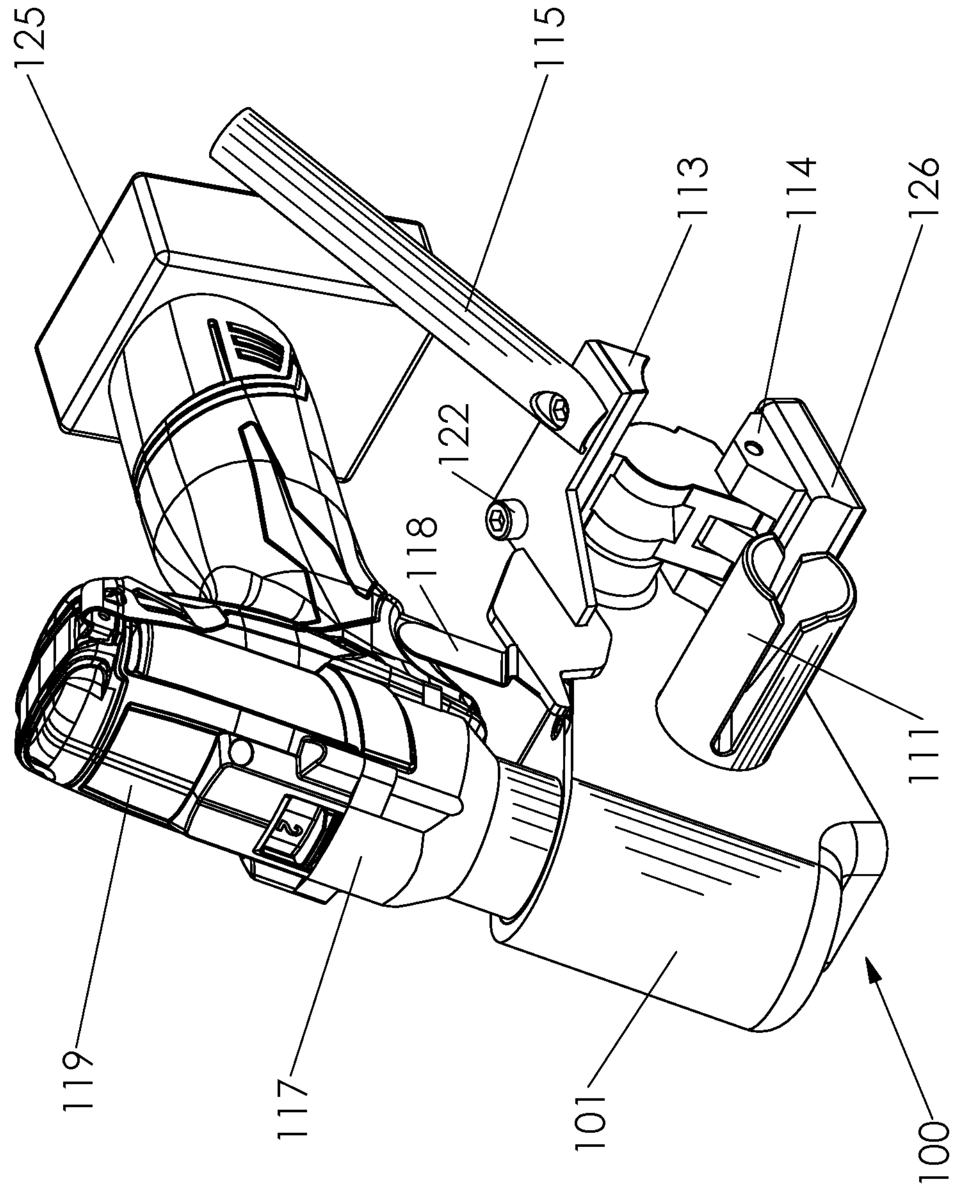
FIG. 8 is a first frontal perspective view of an externally-powered strapping tool according to a second embodiment of the invention.
Figure 9:
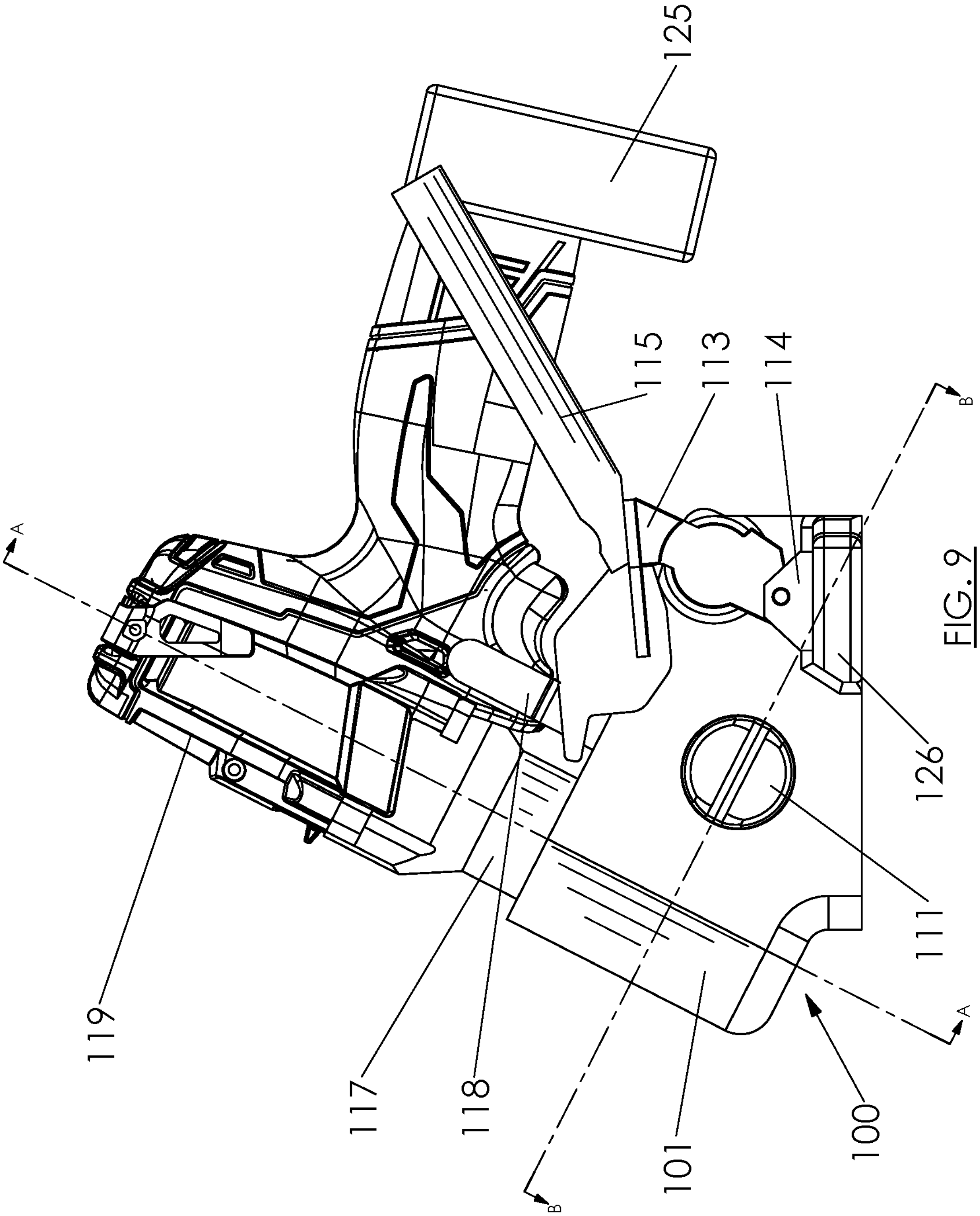
FIG. 9 is a front view of the externally-powered strapping tool according to the second embodiment of the invention.
Figure 10:
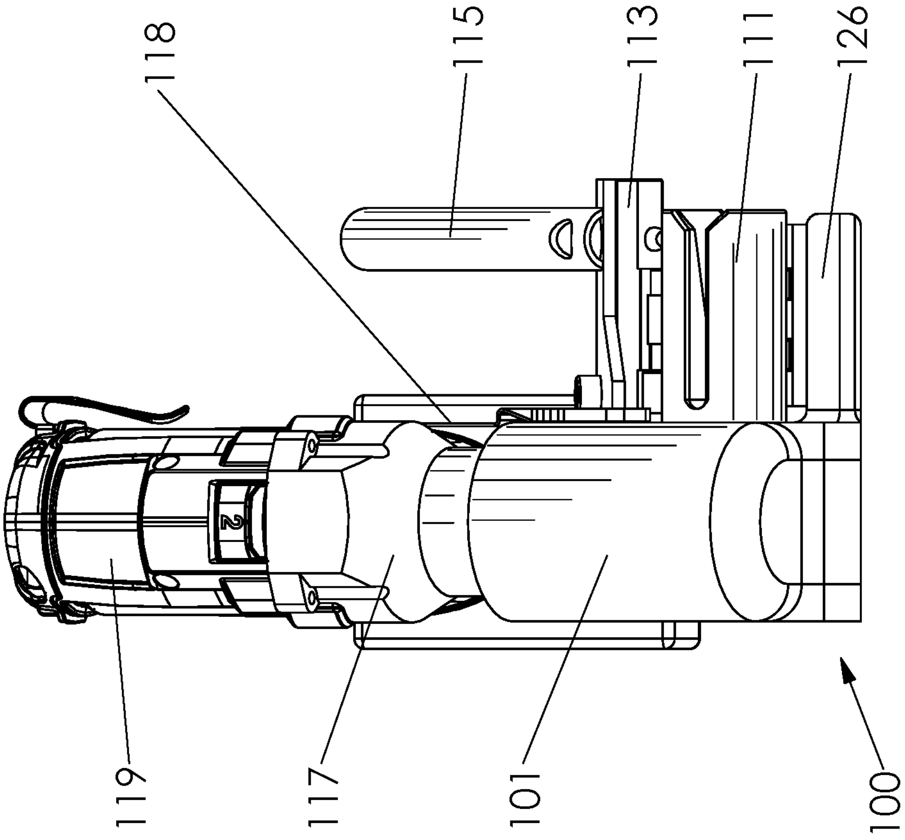
FIG. 10 is a top perspective view of the externally-powered strapping tool according to the second embodiment of the invention.
Figure 11:
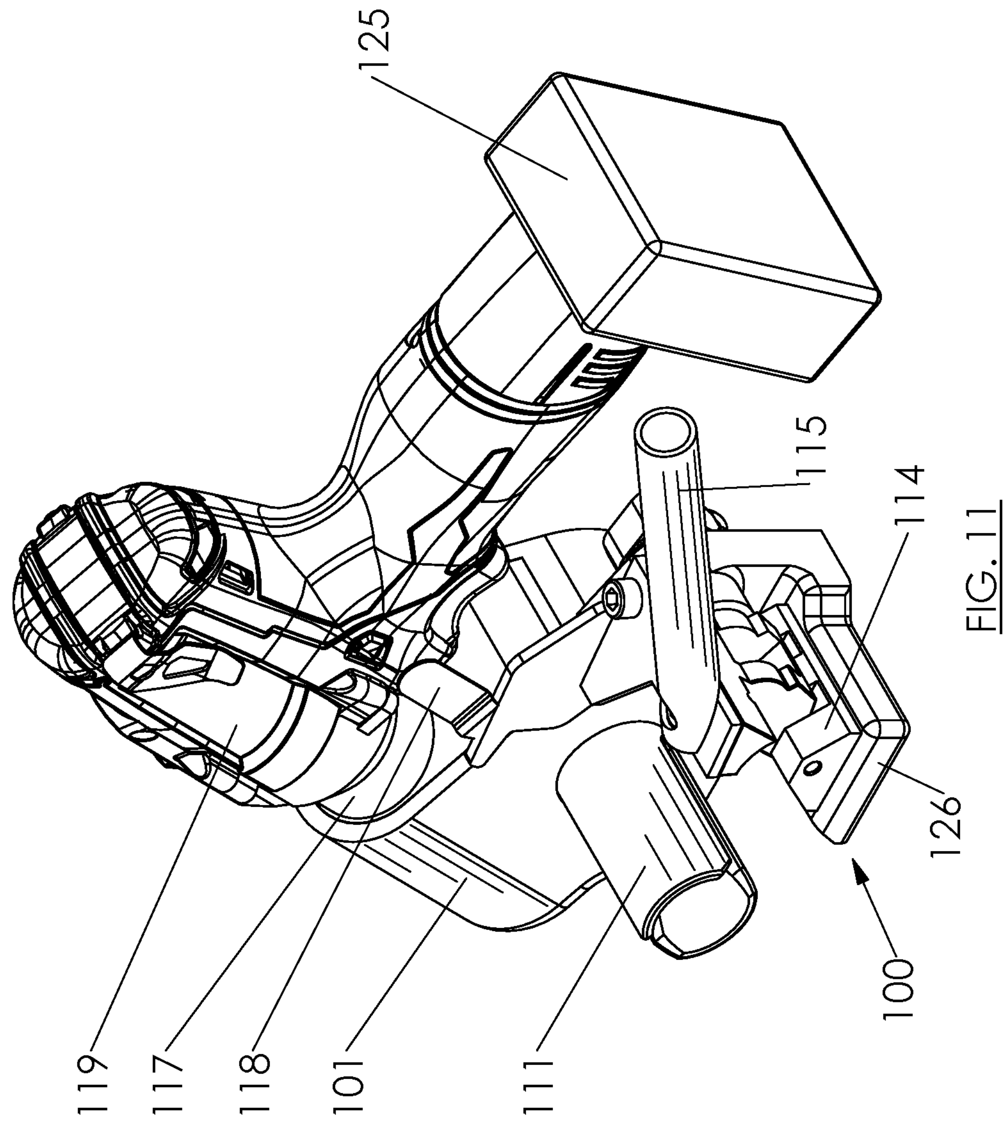
FIG. 11 is a second frontal perspective view of the externally-powered strapping tool according to the second embodiment of the invention, wherein the strapping tool is viewed from a different angle.

As best shown in FIGS. 8, 9, and 11, the external power source of the first embodiment comprises a drill 119 that is powered by a battery pack 125 (e.g., an 12-volt lithium battery pack). For example, one suitable battery-powered drill that could be used for drill 119 is the Milwaukee® M12 Fuel Series drill model no. 2403-20. The battery-powered drill 119 is operatively coupled to the windlass tensioner assembly by means of a transition coupling 117 (i.e., attachment means). The transition coupling 117 prevents the drill 119 from twisting relative to the windlass tensioner assembly. In the illustrated embodiment, the transition coupling 117 is fixedly attached to the gear case 101 by means of one or more fasteners (e.g., cap screws 121—see FIG. 14).

Now, turning to the sectional views of FIGS. 12 and 13, as well as the exploded view of FIG. 14, the internal components of the windlass tensioner assembly will be described in detail. First, as best illustrated in the sectional view of FIG. 12, it can be seen that the drive means of the drill 119 is operatively coupled to the worm shaft 103. Referring again to FIG. 12, it can be seen that the worm shaft 103 is operatively connected to the worm 105. More specifically, the worm 105 is configured to rotate with the worm shaft 103, and relative rotation between the two components 103, 105 is effectively prevented by a keystock member 107. In order to facilitate the free rotation of the worm shaft 103, and to reduce friction, the middle of the worm shaft 103 is provided with a tapered roller bearing 104 disposed around the outer circumference thereof (refer to FIGS. 12 and 14).

Similarly, the lower end of the worm shaft 103 is provided with a flanged bushing 102 disposed around its outer circumference.

Figure 13:
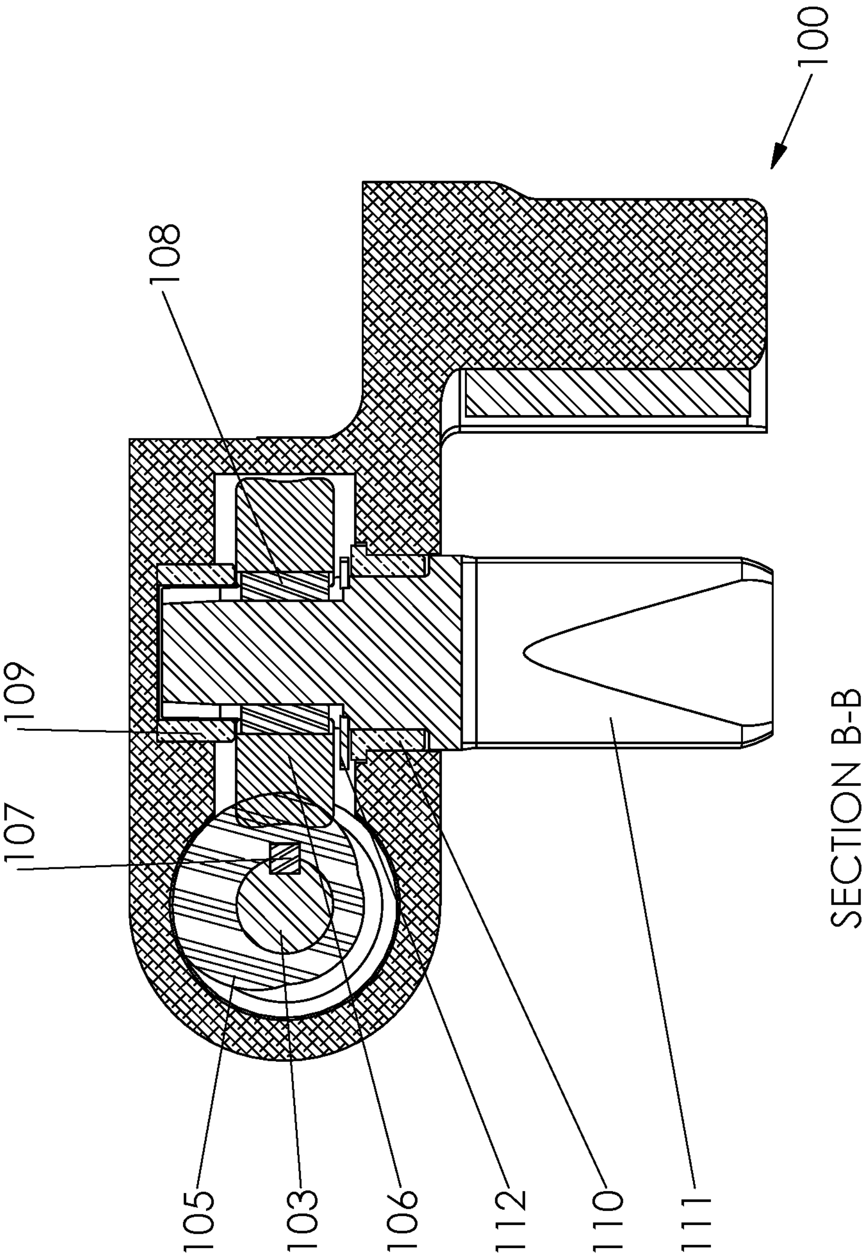
FIG. 13 is a sectional view of the strapping tool assembly of the externally-powered strapping tool according to the second embodiment of the invention, which is cut along the cutting-plane line B-B in FIG. 9.
Figure 14:
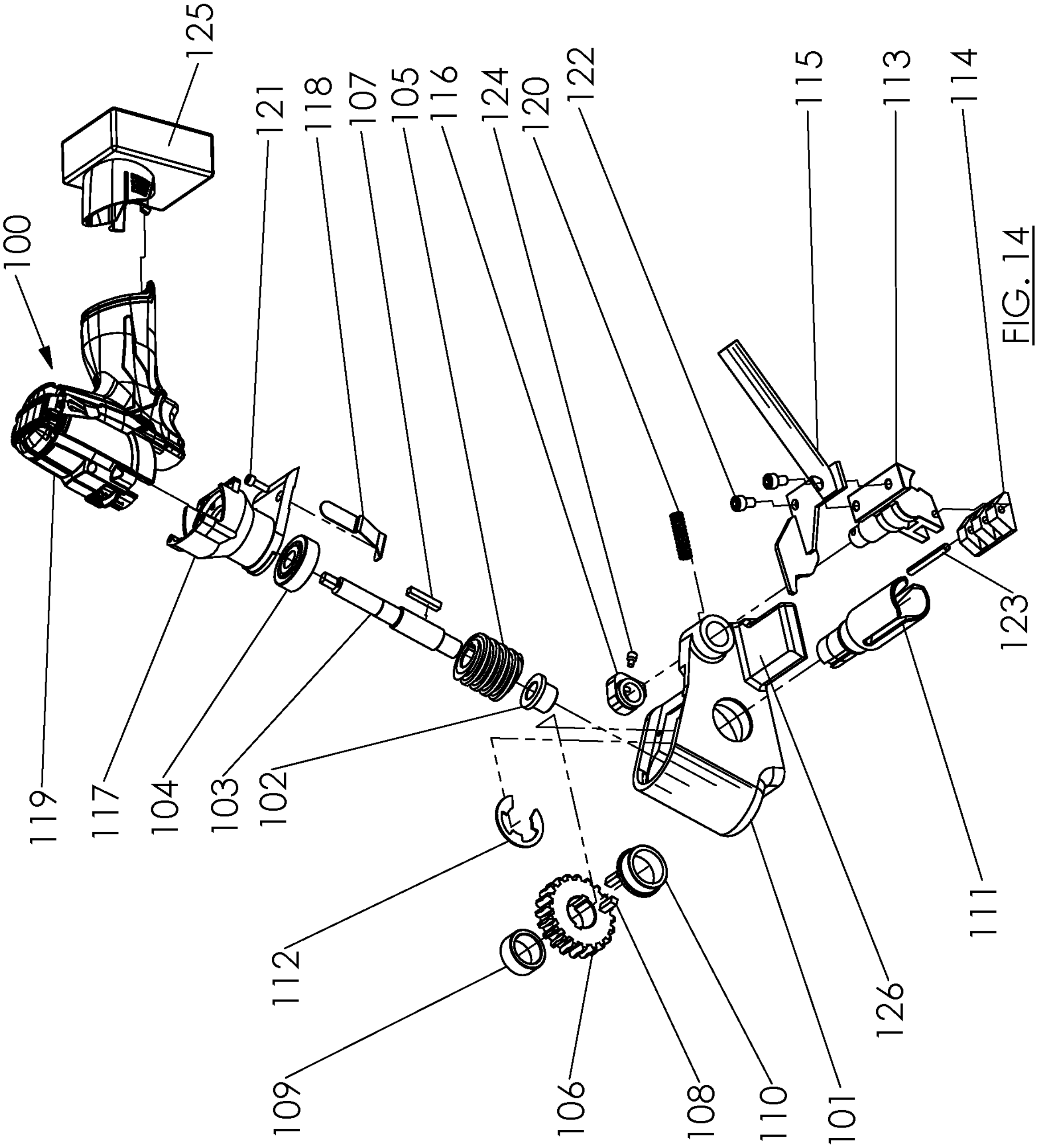
FIG. 14 is an exploded perspective view of the externally-powered strapping tool according to the second embodiment of the invention.

The generally helical threads on the worm 105 matingly engage with the teeth disposed about the circumference of the worm gear 106 (see FIGS. 13 and 14). As most clearly depicted in the sectional view of FIG. 13, the worm gear 106 is operatively connected to the slotted main shaft 111 of the windlass tensioner assembly. More particularly, the slotted main shaft 111 is configured to rotate with the worm gear 106, and relative rotation between the two components 106, 111 is effectively prevented by the plurality of keystock members 108 (e.g., two keystock members 108). As best shown in FIGS. 13 and 14, the rotational axis of worm shaft 103 and worm 105 is disposed generally perpendicular with respect to the rotational axis of the worm gear 106 and the slotted main shaft 111. In order to facilitate the free rotation of the slotted main shaft 111, and to reduce friction, the right end of the main shaft 111 is provided with a bushing 109 disposed around the outer circumference thereof (refer to FIG. 13, bushing 109 is located outside the crank shaft). Similarly, a middle portion of the main shaft 111 is provided with a bushing 110 disposed around its outer circumference (see FIG. 13, bushing 110 is located inside the crank shaft). When the components of the strapping tool assembly are assembled, the main windlass shaft 111 is slid into the gear case 101 through the bushing 110, through the worm gear 106, and through the bushing 109. As such, without retention means, it would be possible for the main shaft 111 to slide out of the gear case 101 in the same manner in which it is inserted. Thus, as depicted in FIG. 13, it can be seen that an E-style snap ring 112 is provided between the bushing 110 and the left side of the worm gear 106. The E-style snap ring 112 retains the slotted main shaft 111 in the gear case 101 so as to prevent it from becoming detached therefrom.

Figure 12:
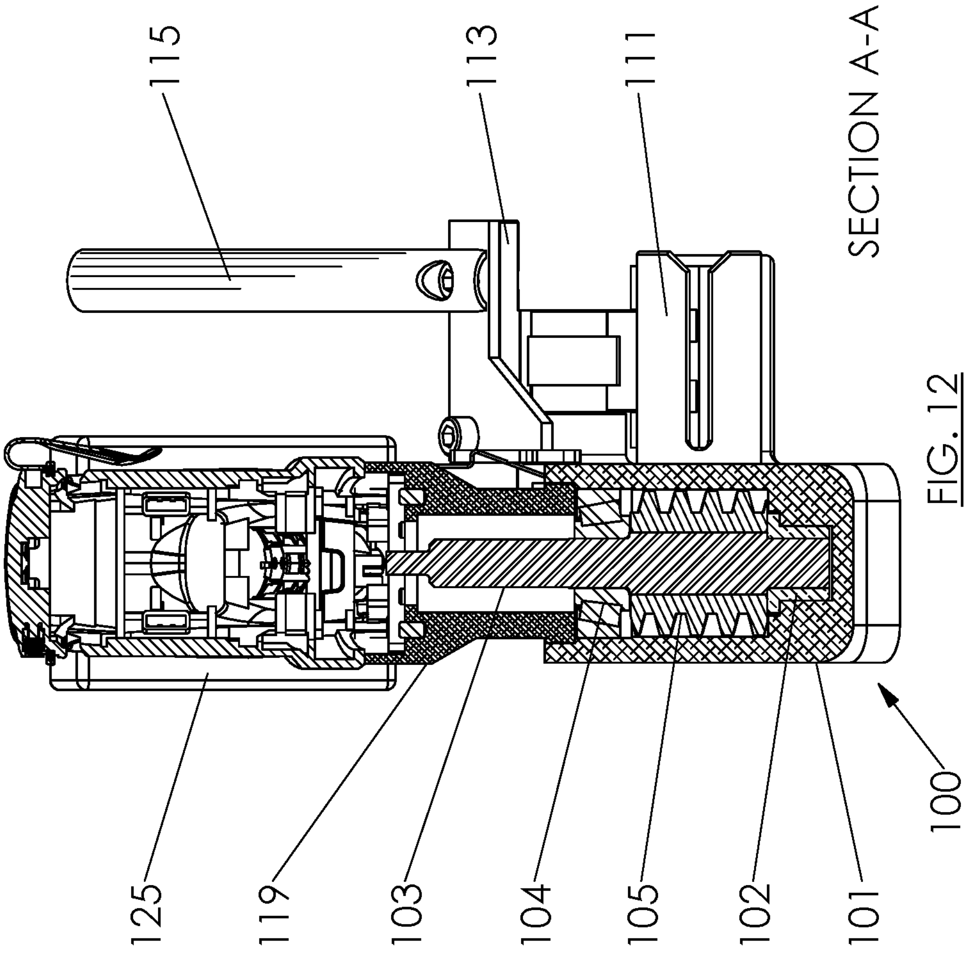
FIG. 12 is a longitudinal sectional view of the externally-powered strapping tool according to the second embodiment of the invention, which is cut along the cutting-plane line A-A in FIG. 9.

As depicted in FIGS. 12 and 14, the aforedescribed internal components of the windlass tensioner assembly are housed within a gear case 101. That is, the components 102, 103, 105, 109, 110, 111, and 112 are housed, and held in place within the case 101.

Next, the foot subassembly of the windlass tensioner assembly will be described with reference to FIGS. 8, 9, 11, 12, and 14. Beginning with FIG. 8, it can be seen that the foot subassembly comprises a foot 114 which is attached to a lock handle 115 by means of a leg and shaft assembly 113. The foot 114 is rotatably coupled and attached to the leg and shaft assembly 113 by means of foot pin 123 (see FIG. 14). As shown in FIG. 8, a foot base plate 126 is disposed underneath the foot 114. Turning to FIG. 14, it can be seen that, in the illustrated embodiment, the foot base plate 126 is integrally formed with a front portion of the gear case 101. With reference to FIGS. 8 and 14, it can be seen that the lock handle 115 is affixed to the generally flat, top portion of the leg and shaft subassembly 113 by a plurality of cap screws 122 (e.g., two (2) screws as illustrated in FIGS. 8 and 14).

Similar to described above for the windlass tensioner 50, when the windlass tensioner 100 is used for applying tension to a strap, the strap is sandwiched between the bottom surface of the foot 114 and the top surface of the foot base plate 126. The foot leg and shaft 113 are held in place by a lift release retainer 116. A die spring 120, which is disposed inside the gear case 101, applies a spring force on the lift release retainer 116 in order to hold the foot 114 against the top surface of the strap (see FIG. 14). The shaft of the leg and shaft assembly 113 is inserted into a circular aperture of the gear case 101 and through the circular aperture of the retainer 116. The retainer 116 holds the shaft of the leg and shaft assembly 113 in the gear case 101, and also engages the coil spring 120. As shown in FIG. 14, a screw 124 is used to secure the retainer 116 to the shaft of the leg and shaft assembly 113. In particular, the shaft of the leg and shaft assembly 113 is provided with an aperture for receiving the screw 124, thereby securing the retainer 116 to the shaft. After the requisite tension has been applied to the strap being tightened, the lock handle 115 can be used to pick up the foot 114 so that the strap can be removed from the windlass tensioner assembly. Similar to the thumb release 17 described above, the thumb release 118 acts as a spring that latches when the handle 115 is lifted up. The thumb release 118 holds the handle 115 in the "up" position so as to make it easy to load the strap. Once the strap is loaded under the foot 114, the user or operator of the windlass tensioner 100 simply uses his or her thumb to press thumb release 118 which, in turn, releases the foot 114 down onto the strap to hold it down.

In an exemplary embodiment, the windlass tensioner 100 has an overall length of approximately 10.2 inches and a height of approximately 8.6 inches. Although, it is to be understood that the invention is in no way limited to these particular dimensions. Rather, the invention may be practiced using other suitable dimensions without departing from the spirit and scope of the appended claims.

Because the operation of the windlass tensioner 100 is generally the same as that of the windless tensioner 50 described above, a description of the operation need not be repeated for the windlass tensioner 100.

A third embodiment 200 of an externally-powered strapping tool is illustrated in FIGS. 15-23. In the third embodiment, the externally-powered strapping tool is in the form of a battery-powered steel strap tensioner for tightening a metal strap around a package or other object. Similar to the first and second embodiments, the externally-powered tensioner of the third embodiment generally comprises a strapping tool assembly (i.e., tensioner assembly) that is operatively coupled to an external power source (i.e., battery-powered drill 220). However, unlike the first and second illustrated embodiments, the third illustrated embodiment 200 depicts a 12-volt steel strap tensioner, as opposed to cord strap tensioners. As described above with regard to the first and second embodiments, while the external power source of the third embodiment is in the form of a battery-powered drill 220, those of ordinary skill in the art will appreciate that other suitable external power sources may be substituted for the drill 220 (see examples described above in the first embodiment).

Figure 15:
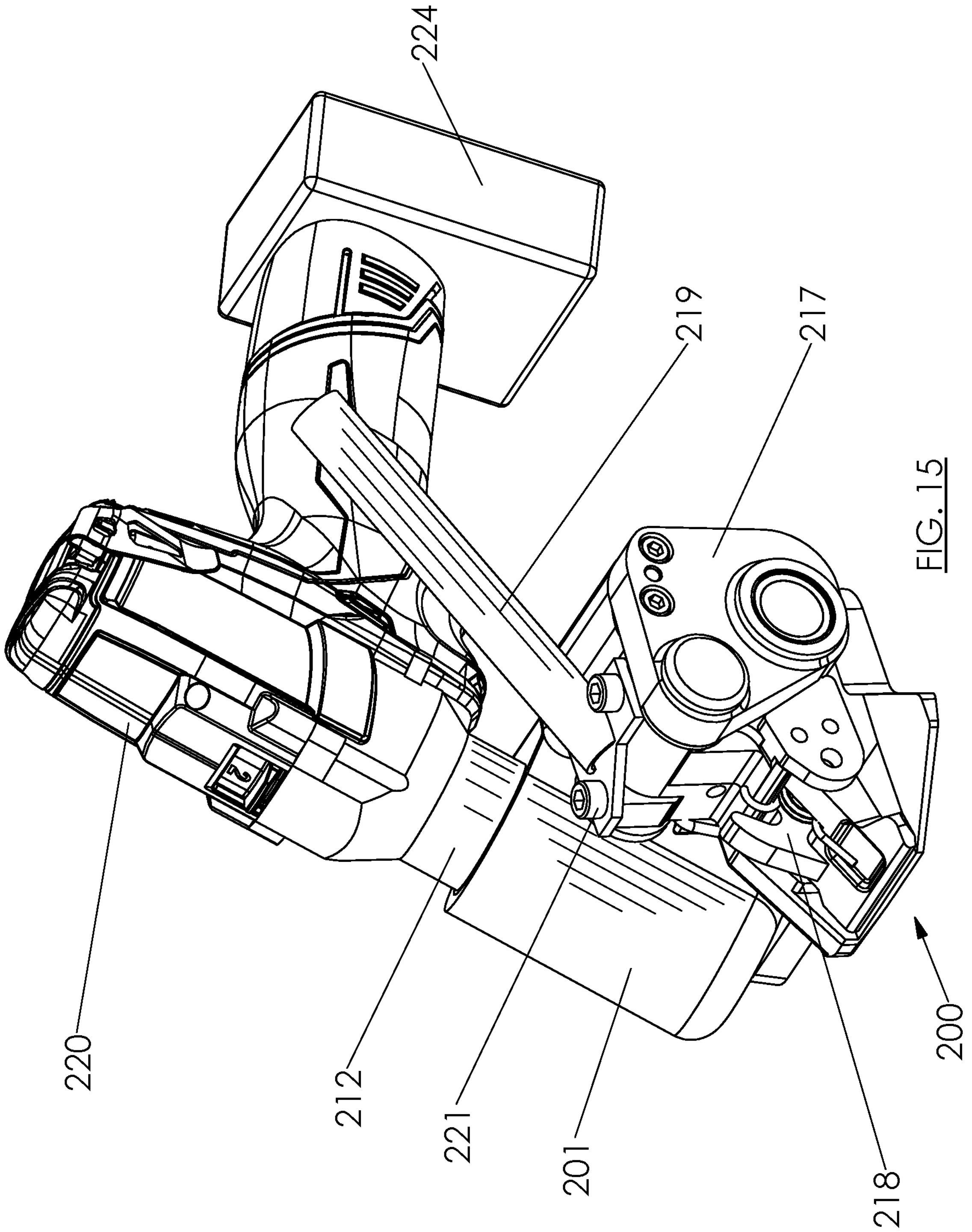
FIG. 15 is a first frontal perspective view of an externally-powered strapping tool according to a third embodiment of the invention.
Figure 16:
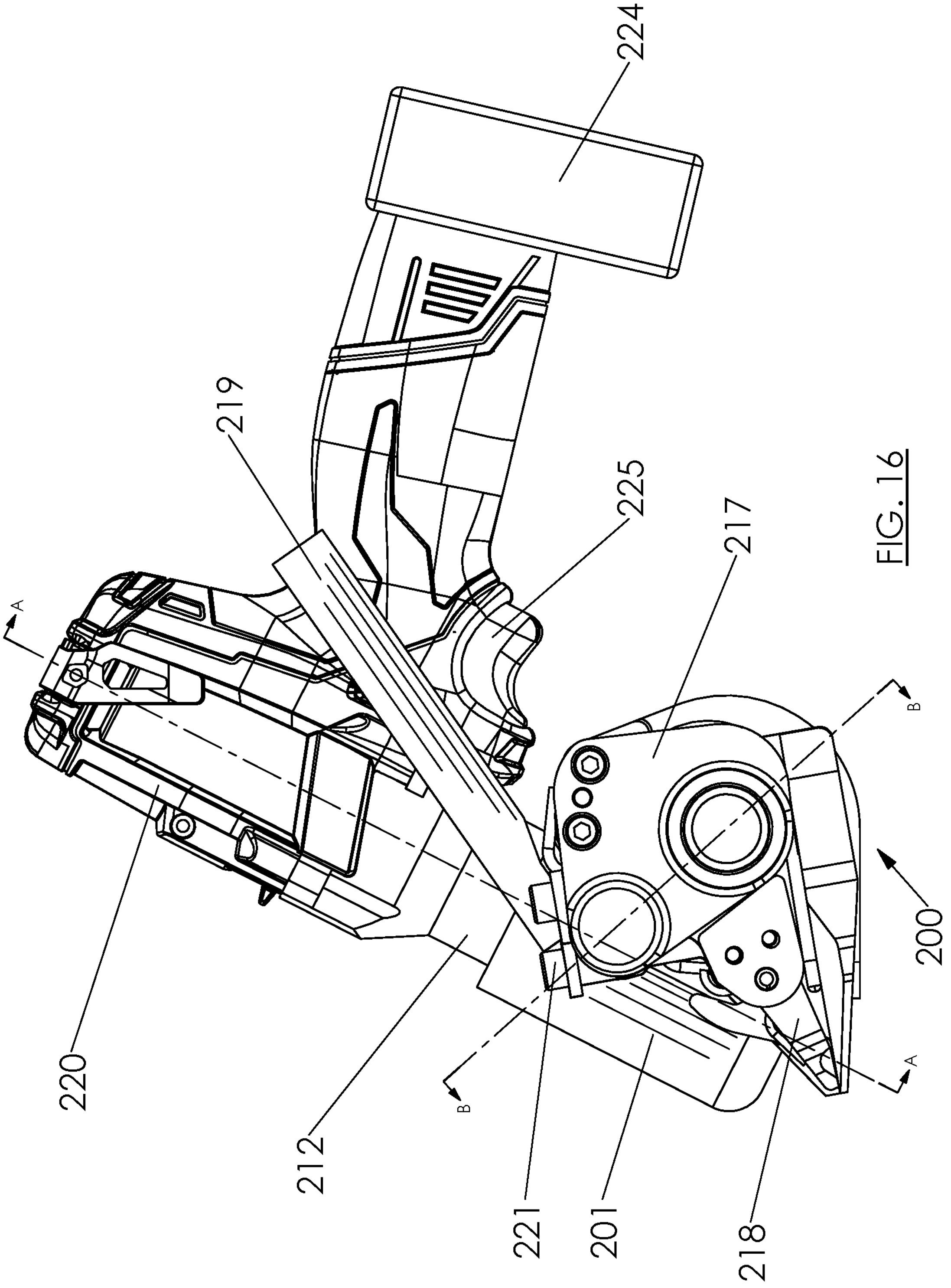
FIG. 16 is a front view of the externally-powered strapping tool according to the third embodiment of the invention.
Figure 17:
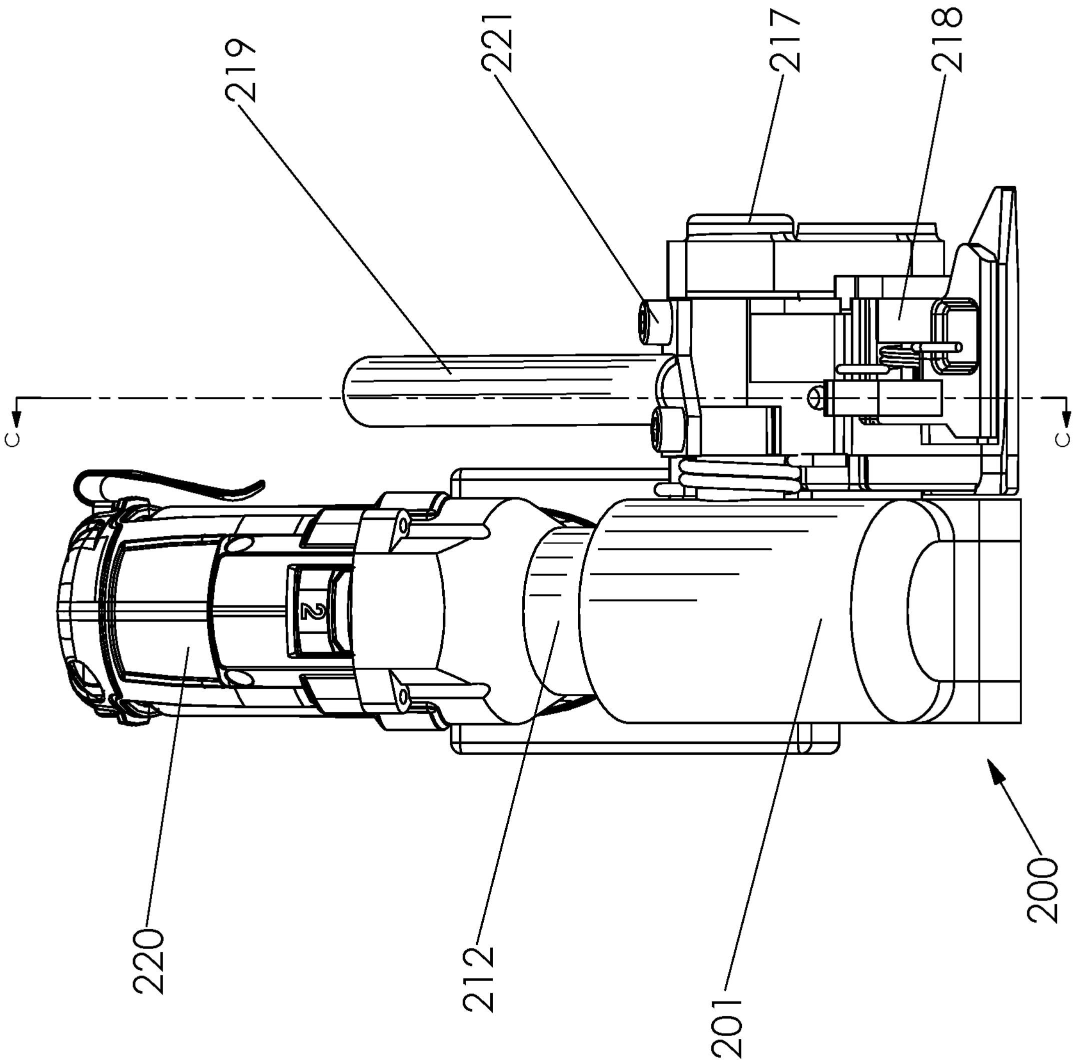
FIG. 17 is a top perspective view of the externally-powered strapping tool according to the third embodiment of the invention.
Figure 18:
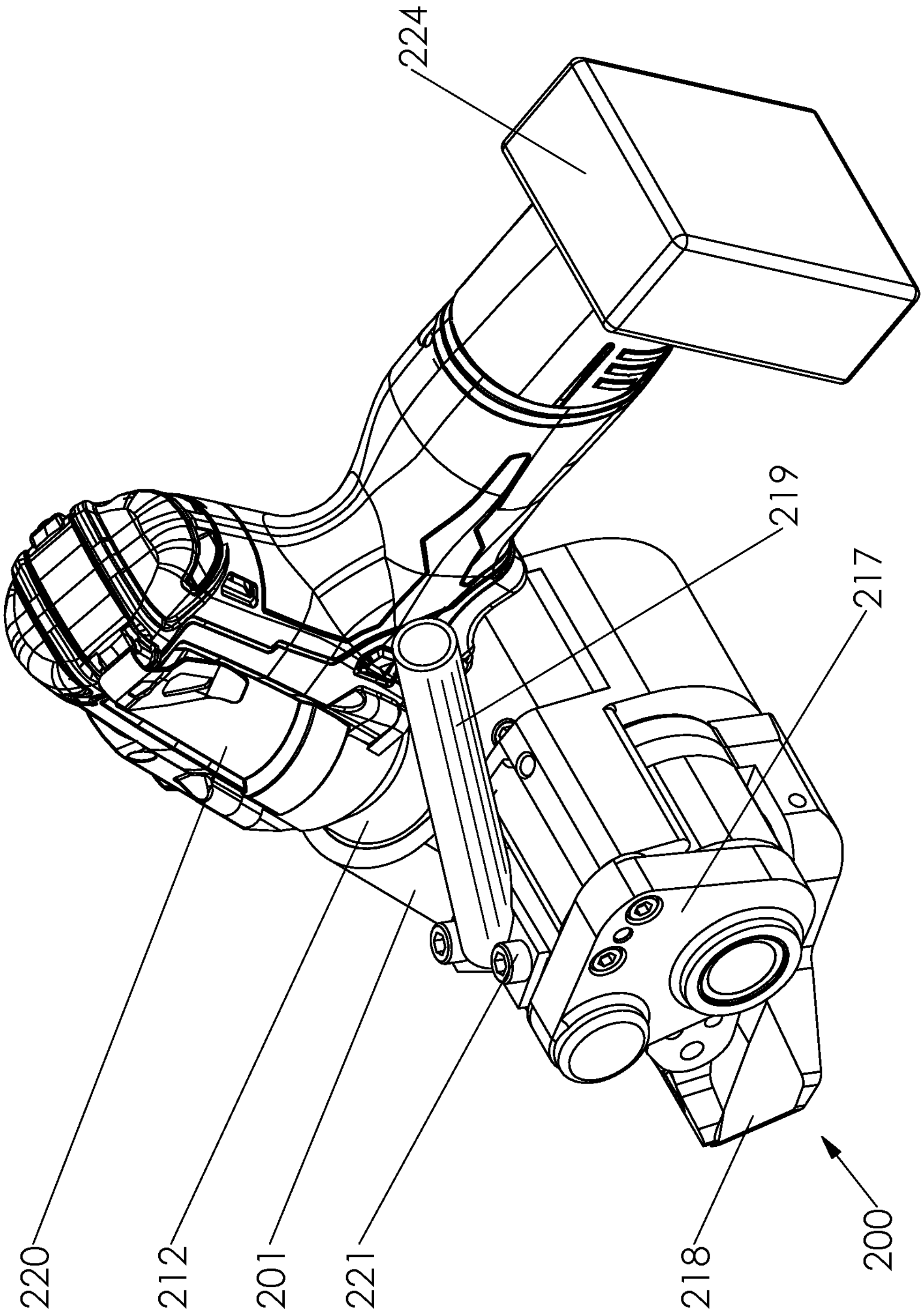
FIG. 18 is a second frontal perspective view of the externally-powered strapping tool according to the third embodiment of the invention, wherein the strapping tool is viewed from a different angle.

As best shown in FIGS. 15, 16, and 18, the external power source of the third embodiment comprises a drill 220 that is powered by a battery pack 224 (e.g., a 12-volt lithium battery pack). For example, one suitable battery-powered drill that could be used for drill 220 is the Milwaukee® M12 Fuel Series drill model no. 2403-20. The battery-powered drill 220 is operatively coupled to the windlass tensioner assembly by means of a transition coupling 212 (i.e., attachment means). The transition coupling 212 prevents the drill 220 from twisting relative to the windlass tensioner assembly. In the illustrated embodiment, the transition coupling 220 is fixedly attached to the gear case 201 by means of one or more fasteners (e.g., cap screws 213—see FIG. 22).

Now, turning to the sectional views of FIGS. 19-21, as well as the exploded view of FIG. 22, the internal components of the tensioner assembly will be described in detail. First, as best illustrated in the sectional view of FIG. 19, it can be seen that the drive means of the drill 220 is operatively coupled to the worm shaft 203. Referring again to FIG. 19, it can be seen that the worm shaft 203 is operatively connected to the worm 205. More specifically, the worm 205 is configured to rotate with the worm shaft 203, and relative rotation between the two components 203, 205 is effectively prevented by a keystock member 206. In order to facilitate the free rotation of the worm shaft 203, and to reduce friction, the middle of the worm shaft 203 is provided with a tapered roller bearing 204 disposed around the outer circumference thereof (refer to FIGS. 19 and 22). Similarly, the lower end of the worm shaft 203 is provided with a flanged bushing 202 disposed around its outer circumference.

Figure 20:
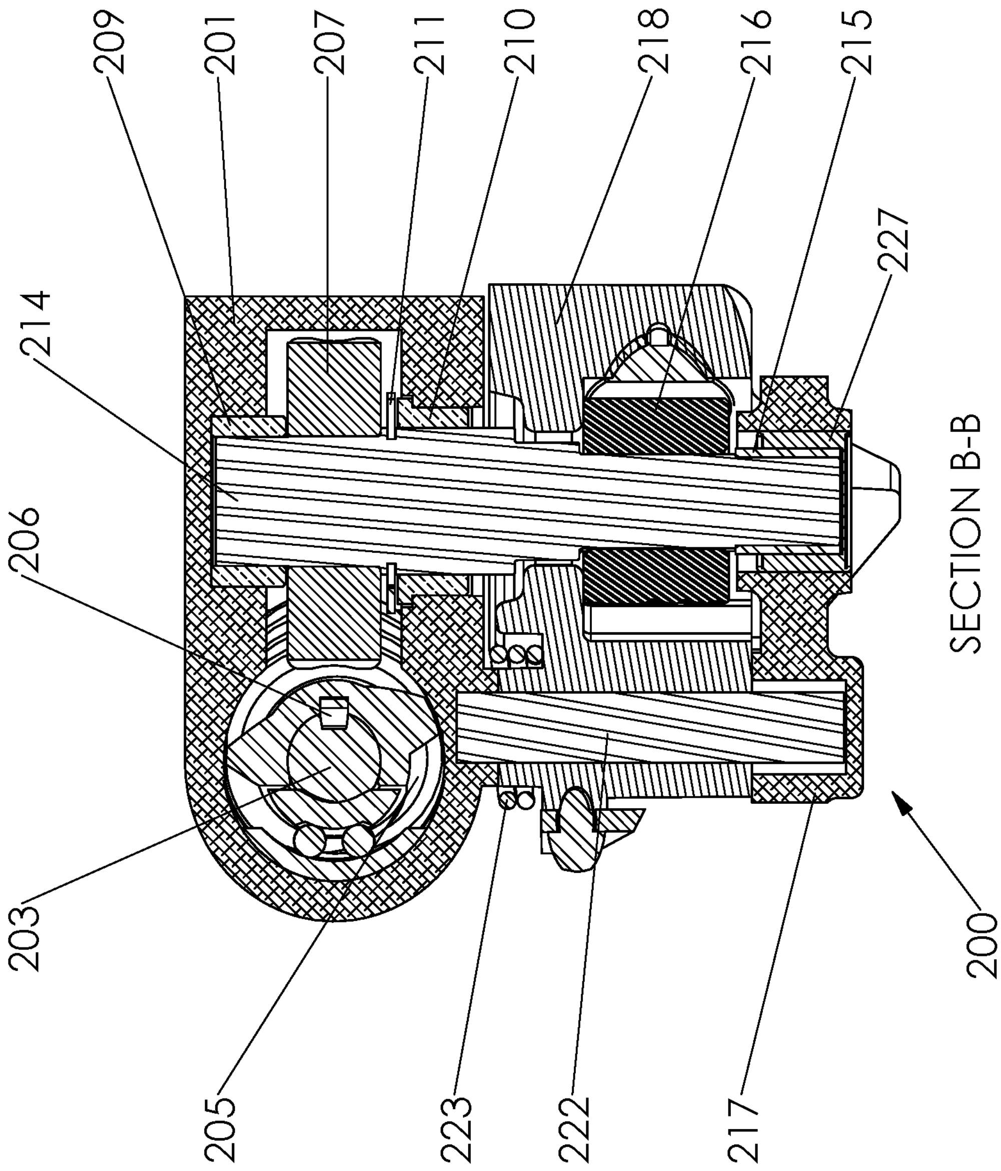
FIG. 20 is a sectional view of the strapping tool assembly of the externally-powered strapping tool according to the third embodiment of the invention, which is cut along the cutting-plane line B-B in FIG. 16.
Figure 21:
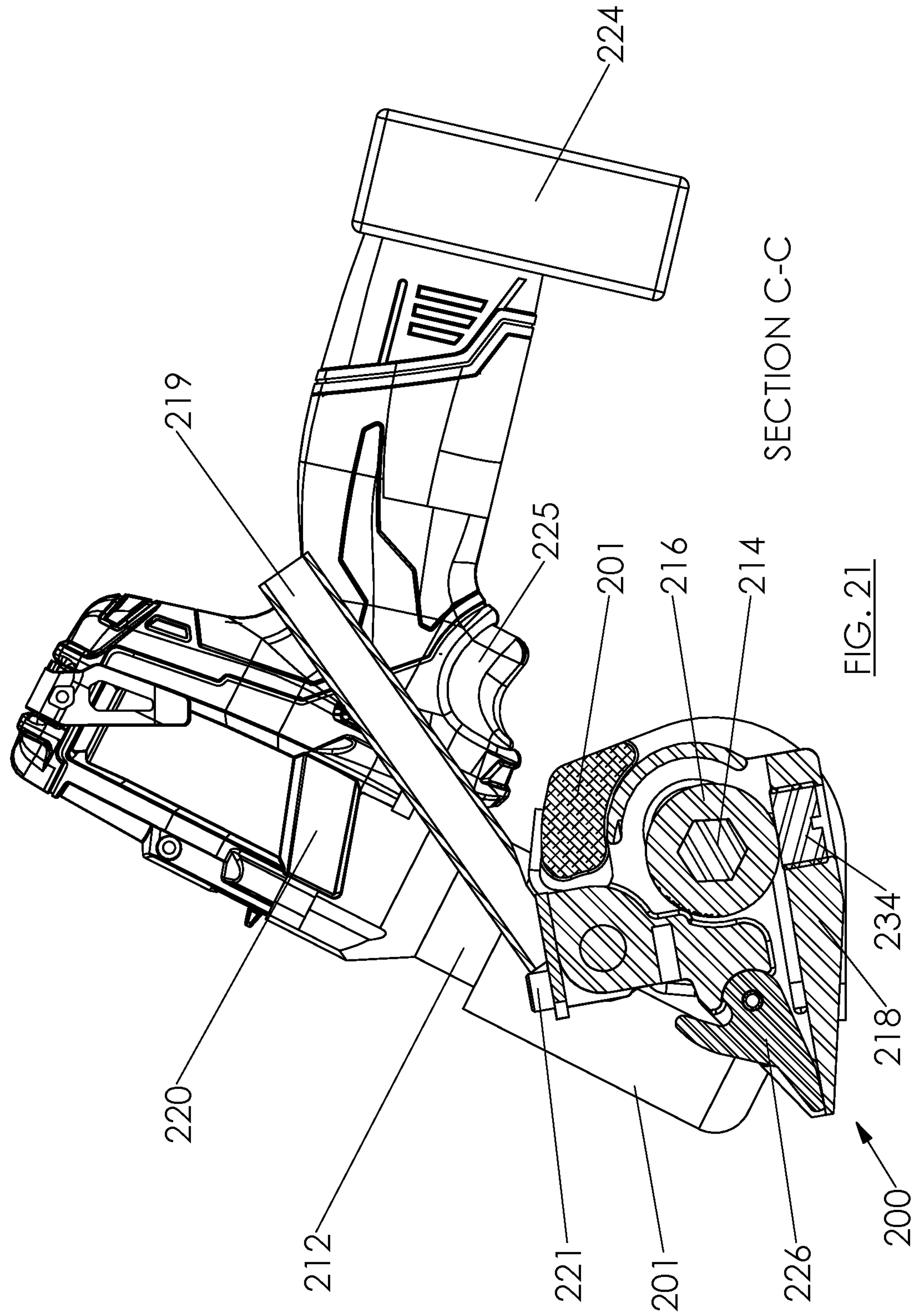
FIG. 21 is a longitudinal sectional view of the externally-powered strapping tool according to the third embodiment of the invention, which is cut along the cutting-plane line C-C in FIG. 17.
Figure 22:
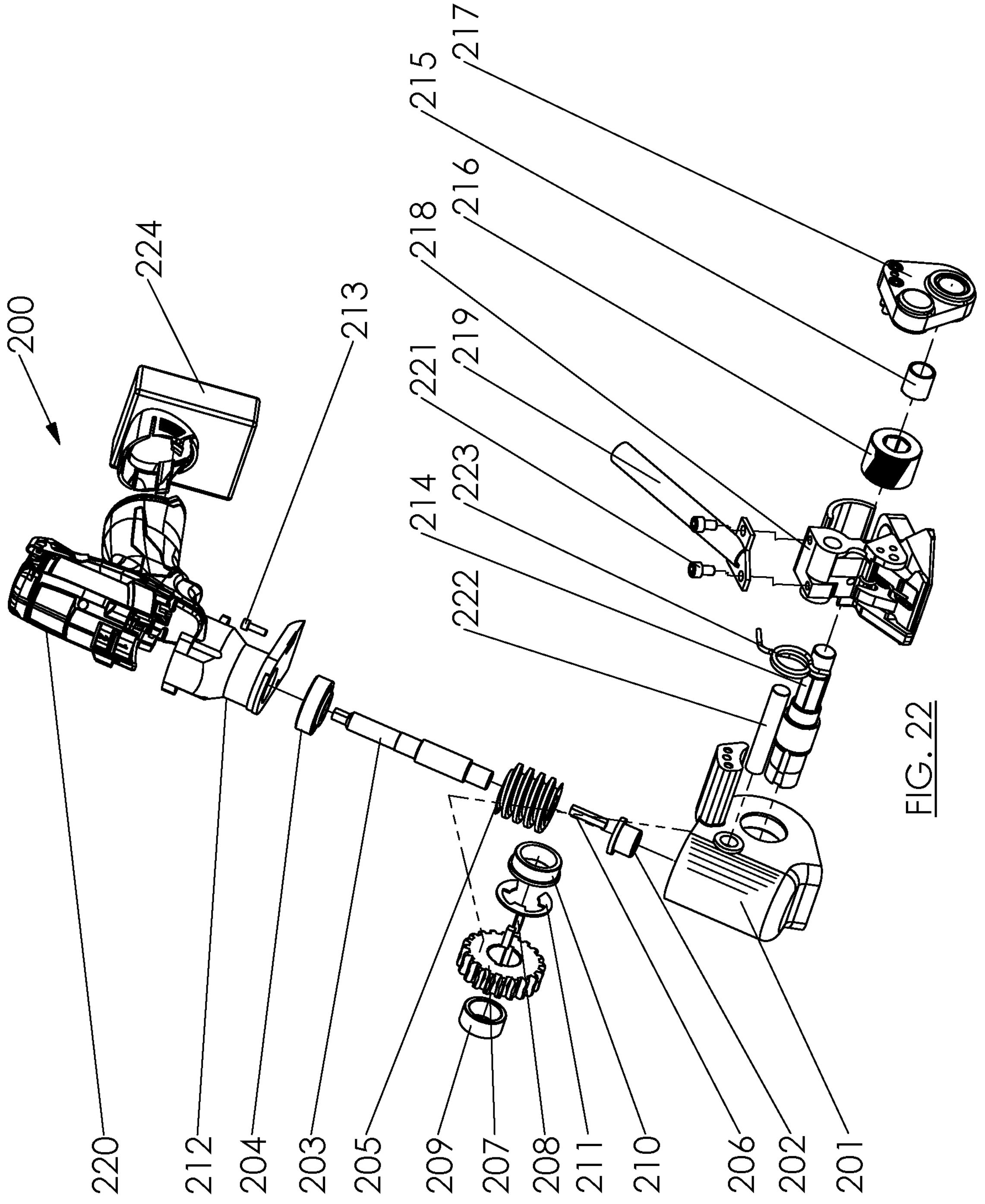
FIG. 22 is an exploded perspective view of the externally-powered strapping tool according to the third embodiment of the invention.

The generally helical threads on the worm 205 matingly engage with the teeth disposed about the circumference of the worm gear 207 (see FIGS. 20 and 22). As most clearly depicted in the sectional view of FIG. 20, the worm gear 207 is operatively connected to the crank shaft 214 of the windlass tensioner assembly. More particularly, the crank shaft 214 is configured to rotate with the worm gear 207, and relative rotation between the two components 207, 214 is effectively prevented by the plurality of keystock members 208 (e.g., two keystock members 208). As best shown in FIGS. 20 and 22, the rotational axis of worm shaft 203 and worm 205 is disposed generally perpendicular with respect to the rotational axis of the worm gear 207 and the crank shaft 214. As shown in the sectional view of FIG. 20, the grip wheel 216 is attached to the crank shaft 214, and rotates therewith (i.e., by means of engagement between the hex shaft 214 and the corresponding hex-shaped aperture of the grip wheel 216). In order to facilitate the free rotation of the crank shaft 214, and to reduce friction, the right end of the crank shaft 214 is provided with a bushing 209 disposed around the outer circumference thereof (refer to FIG. 20, bushing 209 is located outside the crank shaft). Similarly, an interior portion of the crank shaft 214 is provided with a bushing 210 disposed around its outer circumference (see FIG. 20, bushing 210 is located inside the crank shaft). Also, the opposed, left end of the crank shaft 214 is provided with a crank shaft adapter 215 (i.e., in the form an annular bushing) disposed around its outer circumference (refer to FIG. 20). When the components of the strapping tool assembly are assembled, the crank shaft 214 is slid into the gear case 201 through the bushing 110, through the worm gear 207, and through the bushing 209. As such, without retention means, it would be possible for the crank shaft 214 to slide out of the gear case 201 in the same manner in which it is inserted. Thus, as depicted in FIG. 20, it can be seen that an E-style snap ring 211 is provided between the bushing 210 and the left side of the worm gear 207. The E-style snap ring 211 retains the crank shaft 214 in the gear case 201 so as to prevent it from becoming detached therefrom.

Figure 19:
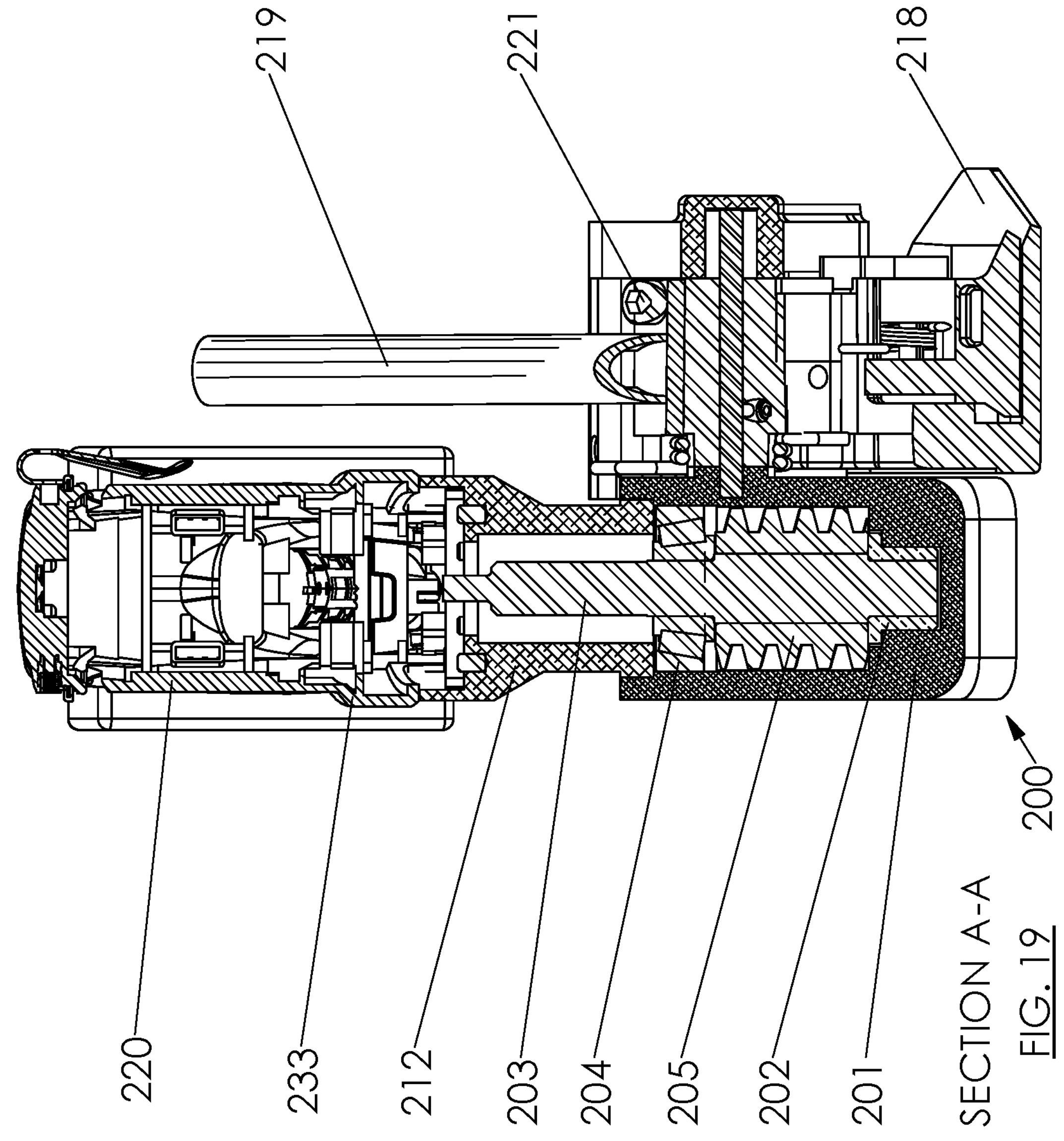
FIG. 19 is a longitudinal sectional view of the externally-powered strapping tool according to the third embodiment of the invention, which is cut along the cutting-plane line A-A in FIG. 16.

As depicted in FIGS. 19, 20, and 22, the aforedescribed internal components of the tensioner assembly are housed within a gear case 201. That is, the components 202, 203, 205, 207, 209, 210, and 211 are housed, and held in place within the case 201.

Figure 23:
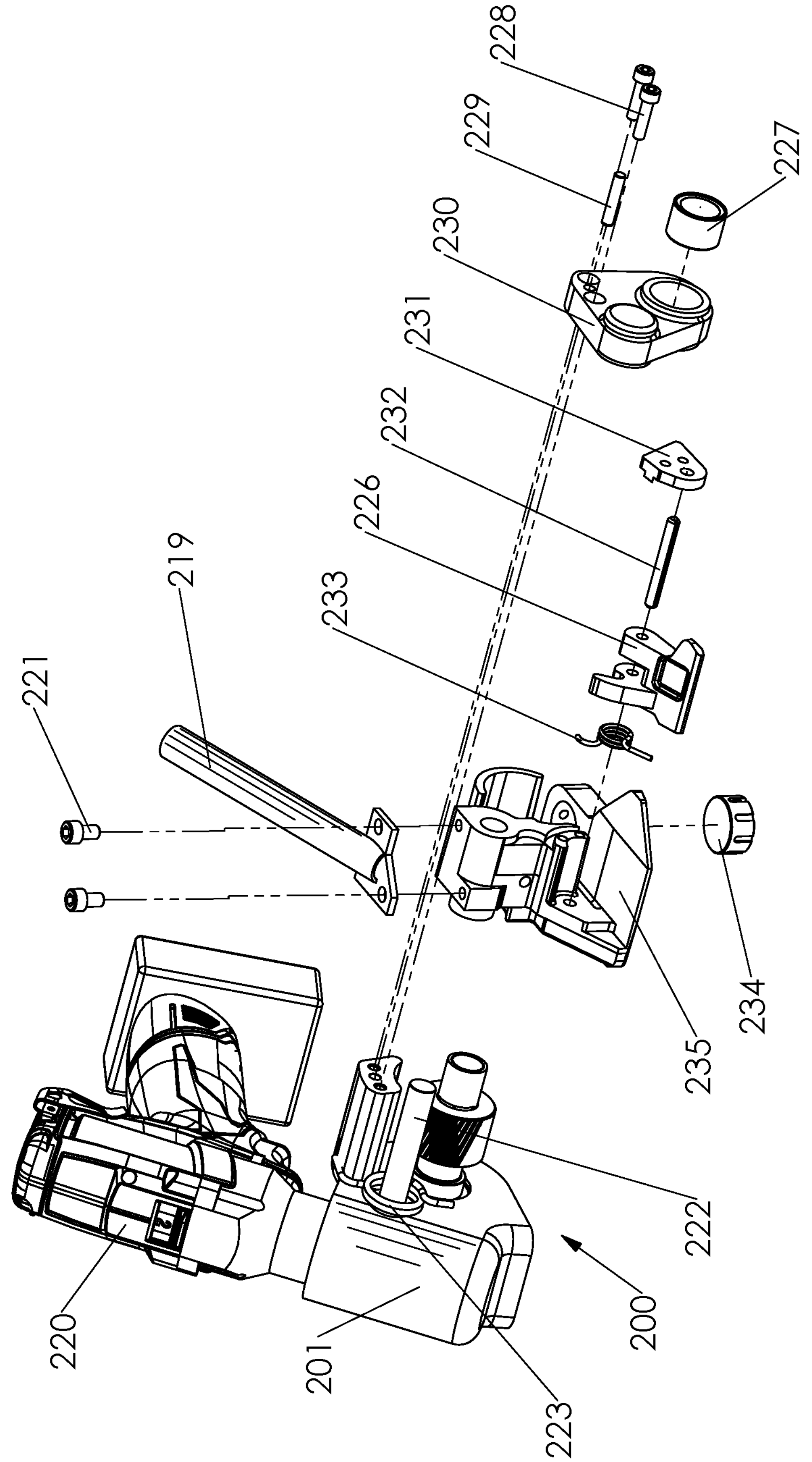
FIG. 23 is another exploded perspective view of the externally-powered strapping tool according to the third embodiment of the invention, wherein the components of the foot assembly are shown exploded.

Next, the foot subassembly 218 of the tensioner assembly will be described with reference to FIGS. 15-17, 22, and 23. Beginning with the exploded view of FIG. 23, it can be seen that the foot subassembly 218 comprises a pivotal foot 226 which is attached to a foot release handle 219 by means of a foot base plate and attachment assembly 235. The pivotal foot 226 is rotatably coupled and attached to the foot base plate and attachment assembly 235 by means of foot pin 232 (see FIG. 23). As shown in FIGS. 19 and 23, the foot base plate and attachment assembly 235 includes a foot base plate that is disposed underneath the pivotal foot 226. Turning to FIG. 23, it can be seen that, in the illustrated embodiment, the foot base plate is integrally formed with the rest of the foot base plate and attachment assembly 235. With reference to FIGS. 15, 22, and 23, it can be seen that the foot release handle 219 is affixed to the generally flat, top portion of the foot base plate and attachment assembly 235 by a plurality of cap screws 221 (e.g., two (2) screws as illustrated in FIGS. 15, 22, and 23).

Figure 28:
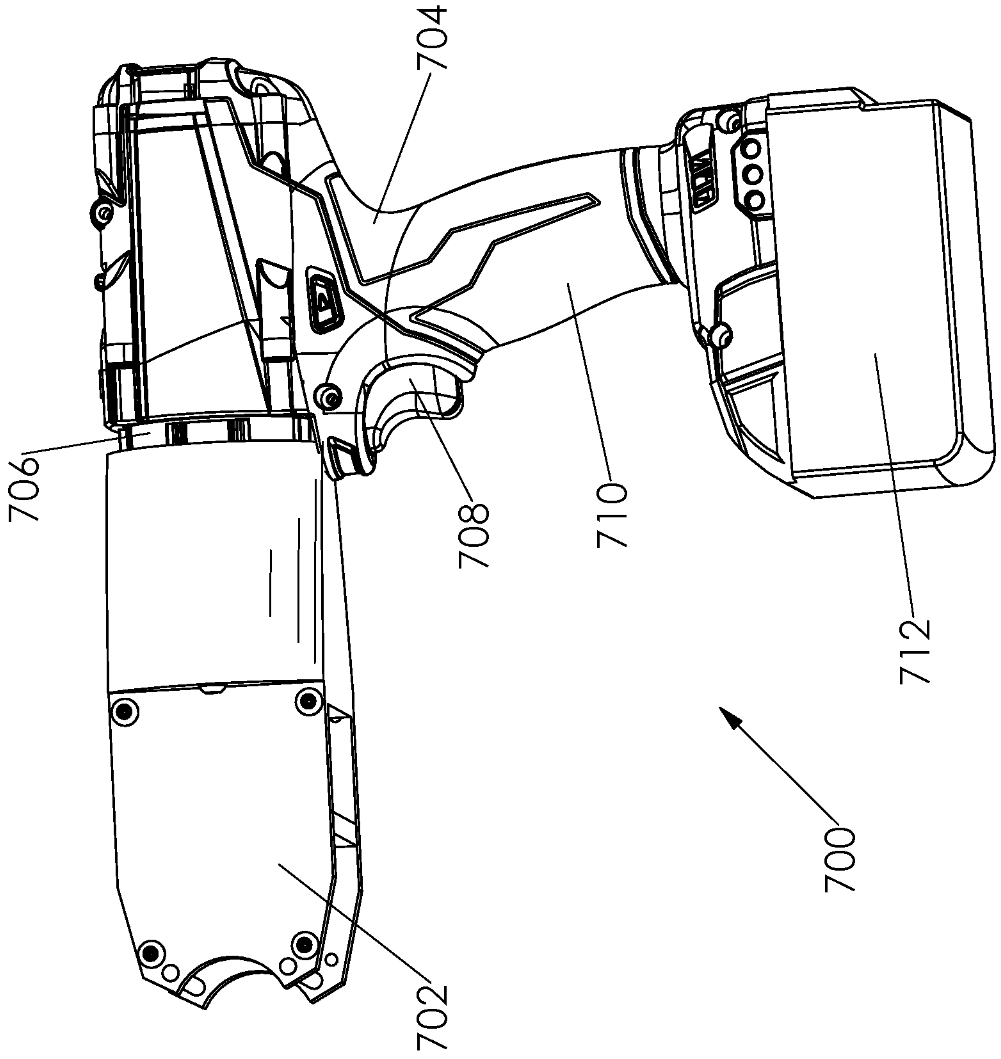
FIG. 28 is a frontal perspective view of an externally-powered strapping tool according to an eighth embodiment of the invention.

Similar to that described above for the windlass tensioners 50 and 100, when the steel strap tensioner 200 is used for applying tension to a strap, the strap is sandwiched between the bottom surface of the pivotal foot 226 and the top surface of the foot base plate of foot base plate and attachment assembly 235. Torsional springs 223 and 233 apply spring forces to the foot assembly 218 and the pivotal foot 226, respectively, in order to hold the pivotal foot 226 against the top surface of the strap (see FIGS. 22 and 23) and the grip wheel 216 against the adjustable sacrificial member 234. The foot assembly 218 is pivotally coupled to the gear case 201 by means of foot pivot pin 222, whereas the pivotal foot 226 is coupled to the foot assembly 218 by means of foot pin 232. As shown in FIG. 23, the foot pin 232 is inserted into a circular aperture of the foot base plate and attachment assembly 235 and through the circular aperture of end plate 231. The end plate 231 holds the pivotal foot 226 against the bounding side of the foot base plate and attachment assembly 235. The cap assembly 217 of FIG. 22 comprises a cap bearing 227, a plurality of screws 22, dowel pin 229, and a side plate 230. The side plate 230, which abuts the foot base plate and attachment assembly 235, holds the components 226, 231, 232, 233 in place within the assembly 235. Referring to FIG. 23, it can be seen that the side plate 230 is preferably affixed to the front of the foot base plate and attachment assembly 235 by means of the screws 228. The dowel pin 229 passes through the side plate 230, and it serves as a locating pin for aligning the tool foot assembly 218 with the gear case 201. Also, as shown in FIG. 28, the tool foot assembly 218 is provided with an adjustable sacrificial member 234, the top of which contacts the bottom surface of the grip wheel 216 (i.e., when no strapping is inserted in the tool). When steel banding is inserted into the tool 200, the steel banding is sandwiched between the top surface of the adjustable sacrificial member 234 and the bottom surface of the grip wheel 216. As the top surface of the adjustable sacrificial member 234 wears down, the sacrificial member 234 can be adjusted so as to always remain in contact with the bottom surface of the grip wheel 216 (i.e., when no strapping is inserted in the tool). After the requisite tension has been applied to the steel strap or banding, the foot release handle 219 can be used to pick up the foot 226, and to separate the grip wheel 216 from the sacrificial member 234, so that the strap can be removed from the tensioner assembly. Similarly, the foot release handle 219 is also used to separate the grip wheel 216 from the sacrificial member 234 when the steel banding is being fed through the tool.

In an exemplary embodiment, the steel strapping tensioner 200 has an overall length of approximately 10.6 inches, a width of approximately 4.8 inches, and a height of approximately 8.6 inches. Although, it is to be understood that the invention is in no way limited to these particular dimensions. Rather, the invention may be practiced using other suitable dimensions without departing from the spirit and scope of the appended claims.

Now, referring to FIGS. 15-23, the operation of the steel strap tensioner 200 of the third embodiment will be described in detail. Initially, a steel strap of one of a number of sizes is looped around the package that requires the restraint. Then, the user threads the ends of the steel strap through a buckle or fastening mechanism. The configuration of the buckle or fastening mechanism allows the steel strap to slide through the buckle unrestrained in one direction and allows no motion the other way. Then, a portion of the steel strap is placed into the tensioning tool 200 and its holding foot 226 is lowered. The foot 226 prevents the tool from creeping forward as tension is applied to the steel strap. The steel strap is threaded through the tensioning slot in tensioner assembly (i.e., under the grip wheel 216). The revolving crank shaft 214 on the tensioner assembly supplies tension and pulls the strap by means of the grip wheel 216. The nose of the tool pushes against the buckle or fastening mechanism as the steel strapping or banding is pulled through by the grip wheel 216. The tool is activated and the grip wheel 216 is turned by squeezing the trigger 225 of the battery-powered drill 220. Once the steel strapping or banding has been sealed, the trigger 225 of the drill 220 is released or the tool stalls out as required. The foot 226 is lifted and the tool tension is released. After which, the steel strapping or banding is removed from the tensioner assembly.

Figure 24:
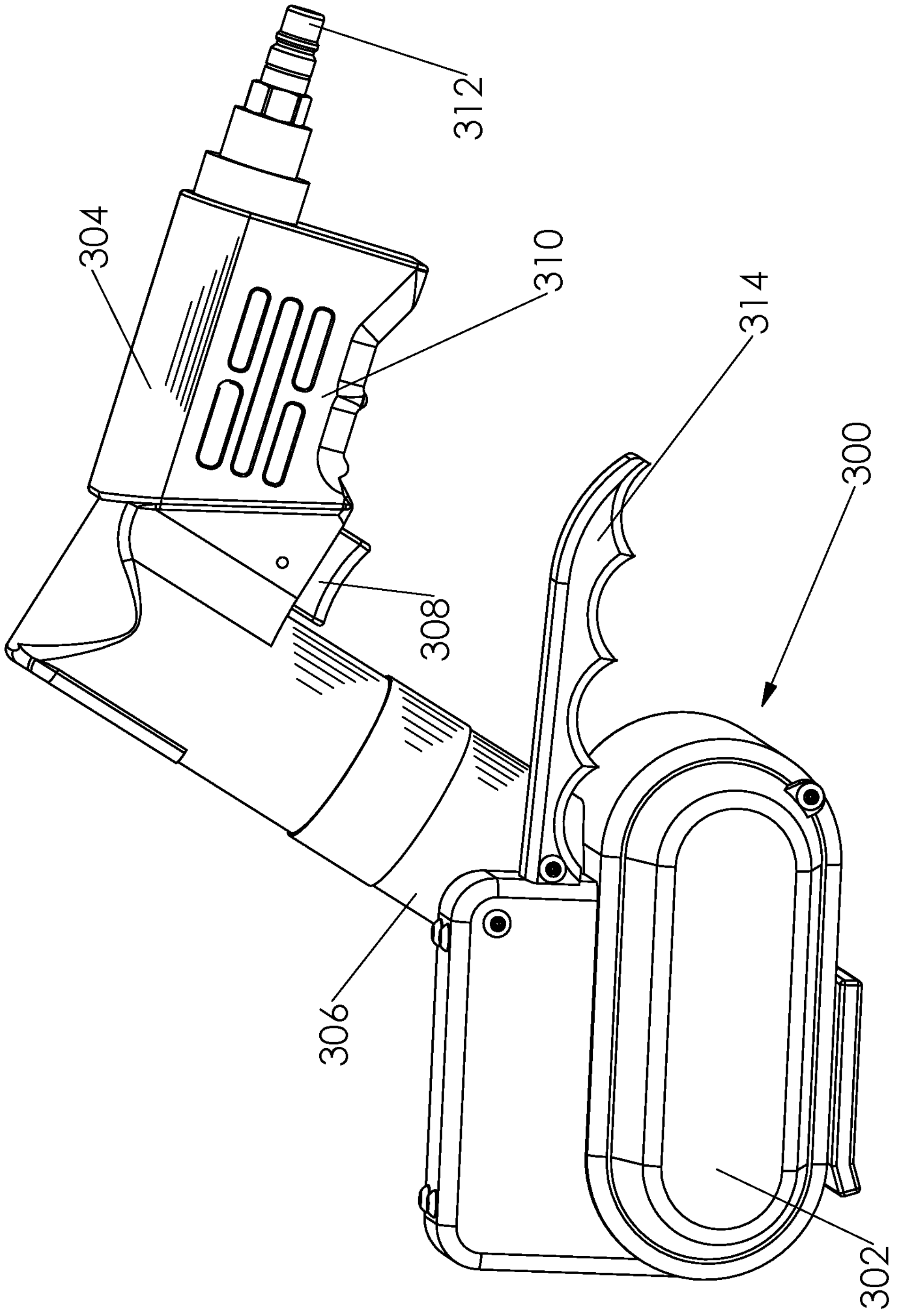
FIG. 24 is a frontal perspective view of an externally-powered strapping tool according to a fourth embodiment of the invention.

A fourth embodiment of an externally-powered strapping tool 300 is illustrated in FIG. 24. In the fourth embodiment, the externally-powered strapping tool 300 is in the form of a welder for binding portions of a strap together. The externally-powered welder 300 of the fourth embodiment generally comprises a strapping tool assembly (i.e., welder assembly 302 with gripping handle 314) that is operatively coupled to an external power source (i.e., pneumatic drill 304) by means of a coupling 306. When using the welding tool, the user grasps the pistol grip 310 of the pneumatic drill and holds down on the trigger 308 thereof. The pneumatic drill 304 is provided with an air connection fitting 312 for coupling the drill 304 to a pneumatic line or air hose. While the external power source of the fourth embodiment is in the form of a pneumatic drill, those of ordinary skill in the art will appreciate that, as was described for the first embodiment above, other suitable external power sources may be substituted for the pneumatic drill.

The air motor operated welding tool 300 of FIG. 24 uses the air motor of the pneumatic drill 304 to supply the motive power for a mechanical friction weld system. In this embodiment, the motion of the air motor is converted to a strapping motion that generates enough heat that plastic banding is fused together. It is also possible that the weld occurs in a fastening sense with a mechanical fastening of steel strapping using mechanisms known to those familiar in the packaging tool art. In addition to welding or fastening, the tool may additionally cut or slice the strapping (banding).

Figure 25:
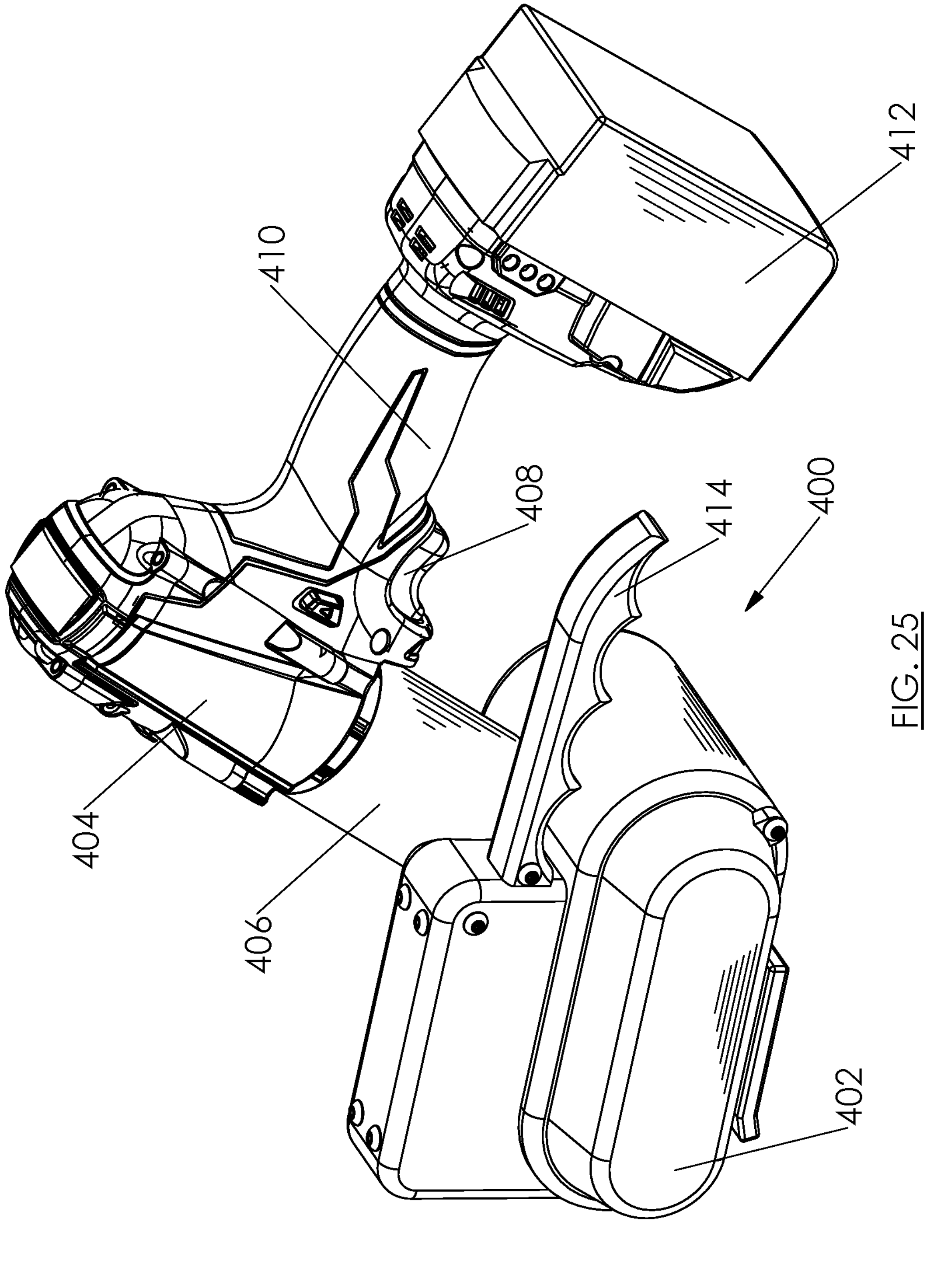
FIG. 25 is a frontal perspective view of an externally-powered strapping tool according to a fifth embodiment of the invention.

A fifth embodiment of an externally-powered strapping tool is illustrated in FIG. 25. Like the fourth embodiment, the externally-powered strapping tool 400 of the fifth embodiment is in the form of a welder for binding portions of a strap together. However, rather than using a pneumatic drill for powering the welder assembly, a battery-powered drill 404 is used for powering the welder assembly in the third embodiment of the invention. The externally-powered welder 400 of the fifth embodiment generally comprises a strapping tool assembly (i.e., welder assembly 402 with gripping handle 414) that is operatively coupled to an external power source (i.e., battery-powered drill 404) by means of a coupling 406. Similar to the fourth embodiment described above, when using the welding tool, a user grasps the pistol grip 410 of the battery-powered drill 404 and holds down on the trigger 408 thereof.

Figure 26:
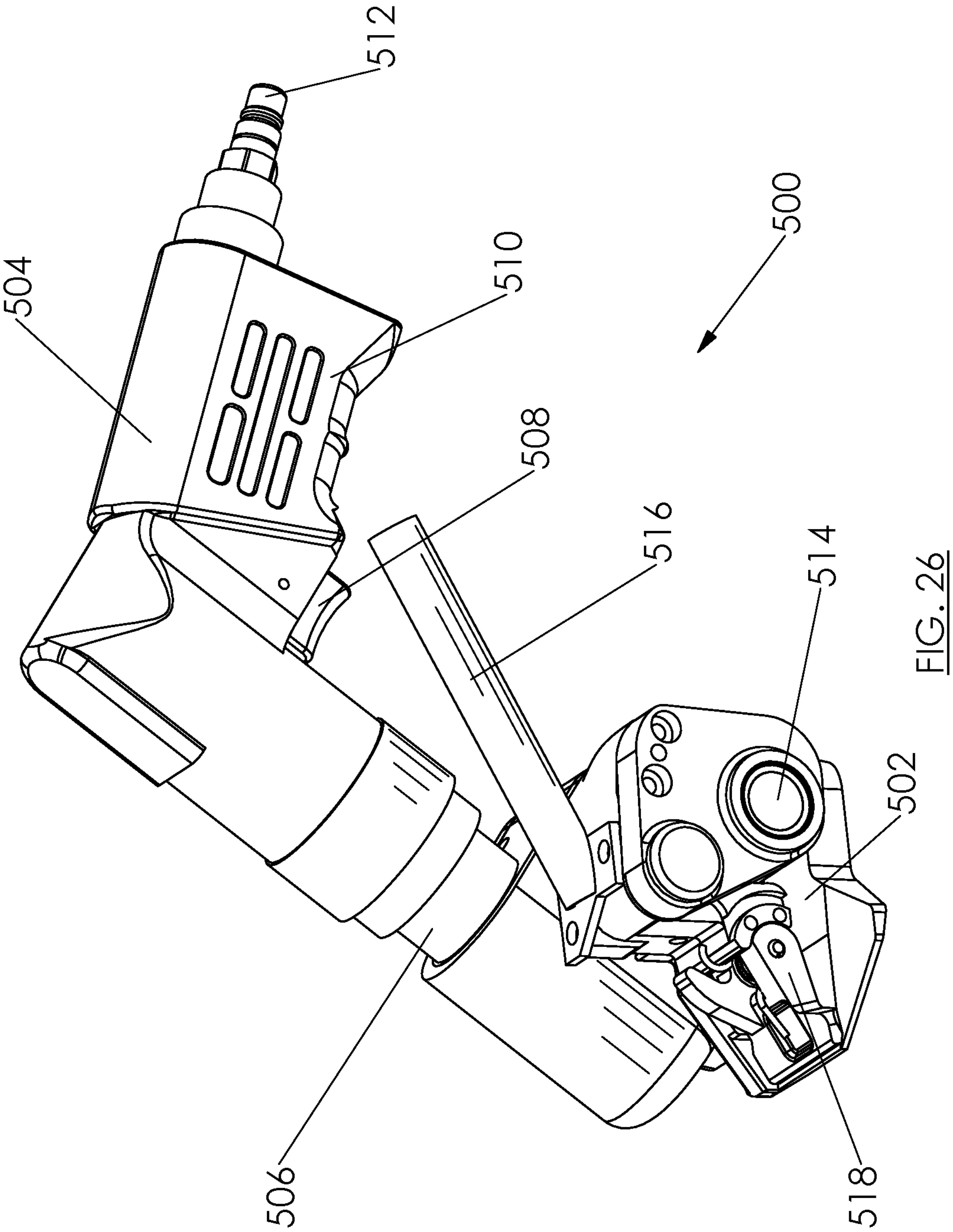
FIG. 26 is a frontal perspective view of an externally-powered strapping tool according to a sixth embodiment of the invention.

A sixth embodiment of an externally-powered strapping tool is illustrated in FIG. 26. In the sixth embodiment, the externally-powered strapping tool 500 is in the form of an air motor operated feedwheel tensioner for applying tension to strapping. The externally-powered feedwheel tensioner 500 of the sixth embodiment generally comprises a strapping tool assembly (i.e., feedwheel tensioner assembly 502 with feedwheel tensioner 514, handle 516, and tool foot subassembly 518) that is operatively coupled to an external power source (i.e., pneumatic drill 504) by means of a coupling 506. When using the feedwheel tensioner tool, the user grasps the pistol grip 510 of the pneumatic drill 504 and holds down on the trigger 508 thereof. The pneumatic drill 504 is provided with an air connection fitting 512 for coupling the drill 504 to a pneumatic line or air hose. While the external power source of the sixth embodiment is in the form of a pneumatic drill with an air intake fluidly coupled to a pneumatic system, those of ordinary skill in the art will appreciate that, as was described for the preceding embodiments above, other suitable external power sources may be substituted for the pneumatic drill.

The air motor operated tensioning tool of FIG. 26 comprises a feed wheel tensioner 514 having a wheel with a serrated outer surface for engaging the strapping (e.g., plastic, steel or cord strapping). By virtue of its serrated wheel, the feedwheel tensioner is capable of applying tension to the strapping. The feedwheel tensioner of the FIG. 26 embodiment uses the mechanical advantage of the natural angle squeeze so as to improve forces normal to the wheel, thereby more heavily engaging the strapping (banding) and improving the tensioning thereof. The air motor operated tensioning tool of FIG. 26 also includes a supporting foot (i.e., tool foot subassembly 518) for withstanding the forces used to develop the tension in the strap or band.

Figure 27:
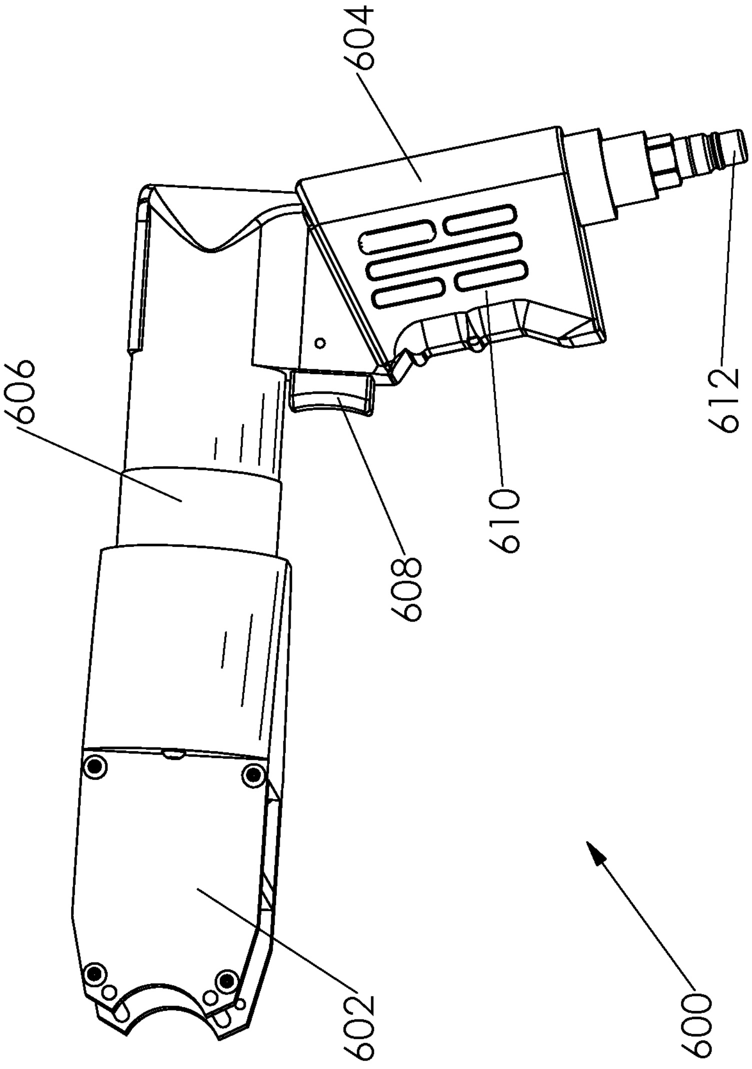
FIG. 27 is a frontal perspective view of an externally-powered strapping tool according to a seventh embodiment of the invention.

A seventh embodiment of an externally-powered strapping tool is illustrated in FIG. 27. In the seventh embodiment, the externally-powered strapping tool 600 is in the form of an air motor operated sealer for binding portions of a strap together (e.g., by sealing the strap mechanically). The externally-powered sealer of the seventh embodiment generally comprises a strapping tool assembly (i.e., sealer assembly 602) that is operatively coupled to an external power source (i.e., pneumatic drill 604) by means of a coupling 606. When using the sealer tool, the user grasps the pistol grip 610 of the pneumatic drill 604 and holds down on the trigger 608 thereof. The pneumatic drill 604 is provided with an air connection fitting 612 for coupling the drill 604 to a pneumatic line or air hose. While the external power source of the seventh embodiment is in the form of a pneumatic tool with an air fitting fluidly coupled to a pneumatic system, those of ordinary skill in the art will appreciate that, as was described for the preceding embodiments above, other suitable external power sources may be substituted for the pneumatic tool.

An eighth embodiment of an externally-powered strapping tool is illustrated in FIG. 28. Like the seventh embodiment, the externally-powered strapping tool 700 of the eighth embodiment is in the form of a sealer for binding portions of a strap together (e.g., by sealing the strap mechanically). However, rather than using a pneumatic drill 604 for powering the sealer assembly, a battery-powered drill 704 with battery pack 712 is used for powering the sealer assembly in the eighth embodiment of the invention. The externally-powered sealer 700 of the eighth embodiment generally comprises a strapping tool assembly (i.e., sealer assembly 702) that is operatively coupled to an external power source (i.e., battery-powered drill 704) by means of a coupling 706. Similar to the seventh embodiment described above, when using the sealer tool 700, a user grasps the pistol grip 710 of the battery-powered drill 704 and holds down on the trigger 708 thereof.

Figure 29:
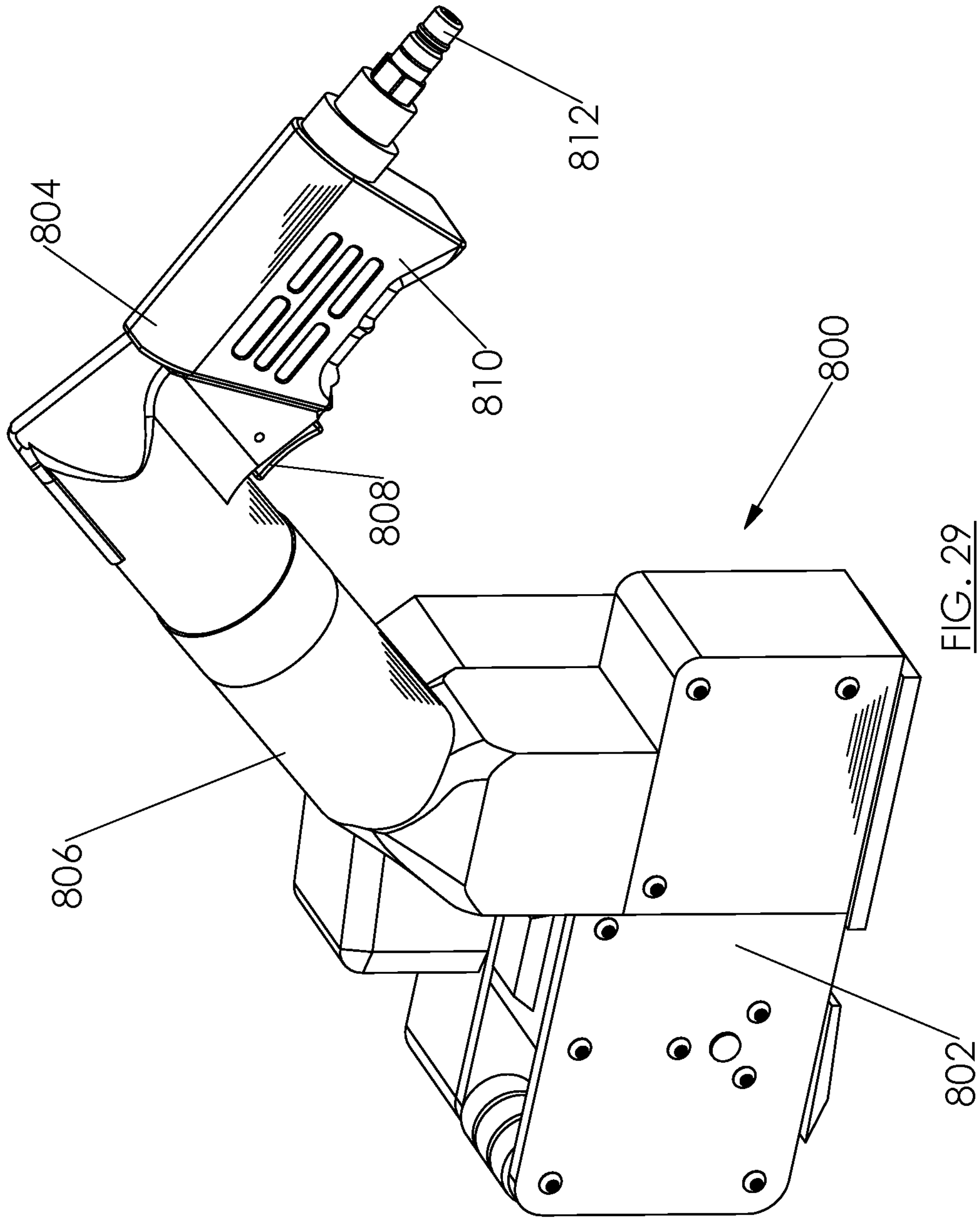
FIG. 29 is a frontal perspective view of an externally-powered strapping tool according to a ninth embodiment of the invention.

A ninth embodiment of an externally-powered strapping tool is illustrated in FIG. 29. In the ninth embodiment, the externally-powered strapping tool 800 is in the form of an air motor operated combination tool for performing a plurality of different strapping operations (e.g., tensioning, welding, and/or cutting). The externally-powered combination tool 800 of the ninth embodiment generally comprises a strapping tool assembly (i.e., combination tool assembly 802) that is operatively coupled to an external power source (i.e., pneumatic drill 804) by means of a coupling 806. When using the combination tool 800, the user grasps the handle (pistol grip 810) of the pneumatic drill 804 and holds down on the trigger 808 thereof. While the external power source of the ninth embodiment is in the form of a pneumatic drill 804 with an air connection fitting 812 fluidly coupled to a pneumatic system, those of ordinary skill in the art will appreciate that, as was described for the preceding embodiments above, other suitable external power sources may be substituted for the pneumatic drill 804.

As illustrated in the ninth embodiment of FIG. 29, an air motor can power a combination tool assembly 802 that tensions the strapping using a feed wheel or other feed system for tensioning. In addition, by employing mechanisms known to those skilled in the packaging tool arts, the combination tool may also fasten the strapping with, for example, a friction bond or a mechanical stitch (or even an electrical weld). Also, the combination tool may be provided with the components necessary for cutting or slicing the strapping (banding) after the application of the strapping (banding) to the package or other object.

Figure 30:
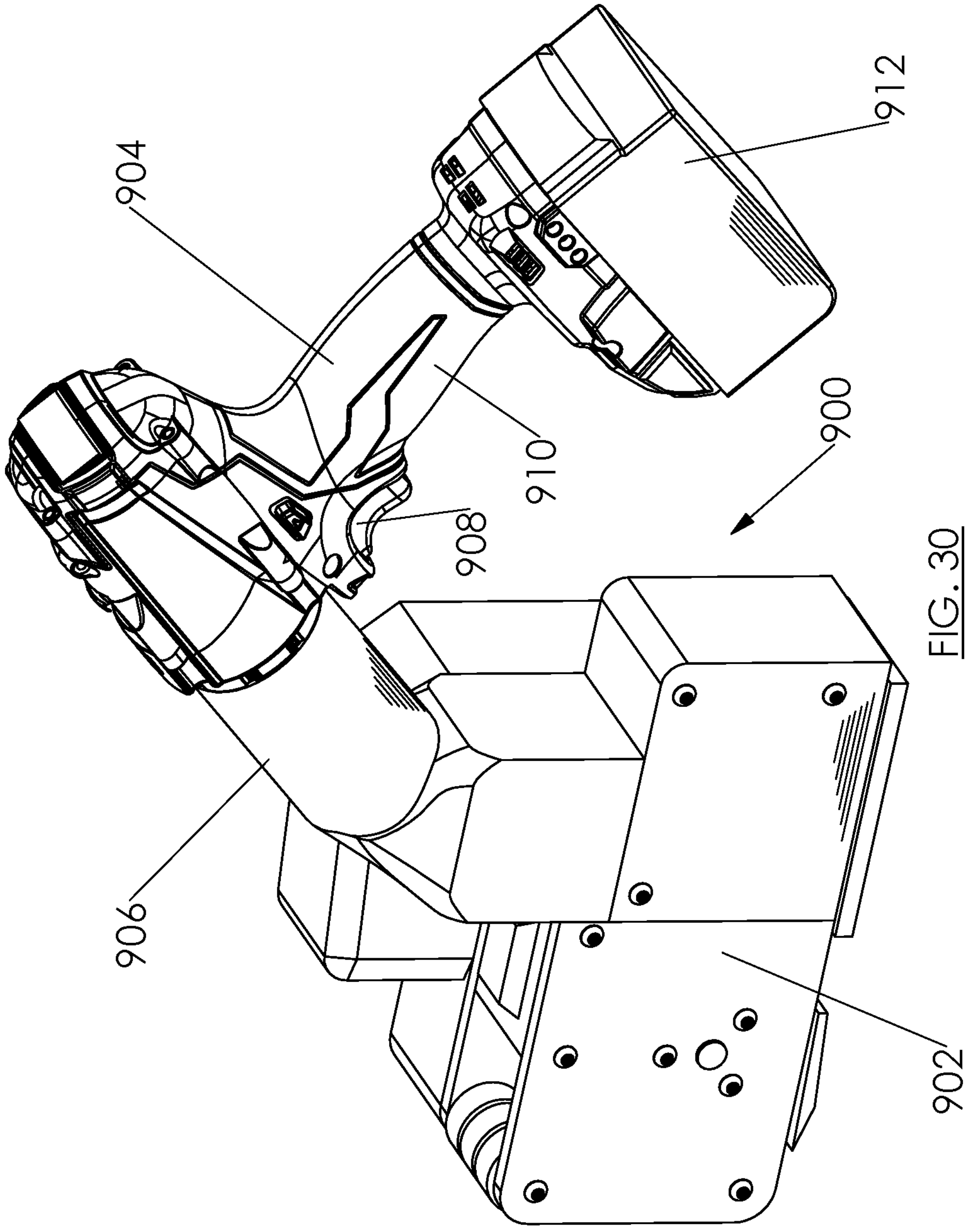
FIG. 30 is a frontal perspective view of an externally-powered strapping tool according to a tenth embodiment of the invention.

A tenth embodiment of an externally-powered strapping tool is illustrated in FIG. 30. Like the ninth embodiment, the externally-powered strapping tool 900 of the tenth embodiment is in the form of a combination tool for performing a plurality of different strapping operations (e.g., tensioning, welding, and/or cutting). However, rather than using a pneumatic drill 804 for powering the combination tool assembly 902, a battery-powered drill 904 with battery pack 912 is used for powering the combination tool assembly in the tenth embodiment of the invention. The externally-powered combination tool 900 of the tenth embodiment generally comprises a strapping tool assembly (i.e., combination tool assembly 902) that is operatively coupled to an external power source (i.e., battery-powered drill 904) by means of a coupling 906. Similar to the ninth embodiment described above, when using the combination tool 900, a user grasps the pistol grip 910 of the battery-powered drill 904 and holds down on the trigger 908 thereof.

The aforedescribed embodiments of the invention utilize various external power sources for a variety of different strapping or packaging tools. In addition to the compressed air and battery power sources described with regard to the preceding embodiments, the motive power for the external power source of the strapping tool could also be electricity from the grid, a fuel cell-based chemical source, or another chemical-based source, such as a gasoline-driven motor or internal combustion engine (as well as any other suitable motive power). The external power source converts the energy source into a mechanical motion that is further converted into energy that is useful to the packaging industry. By adding an intermediate energy conversion device, a very practical energy conversion is possible. This conversion can be made more reliable, more efficient, more flexible, more interchangeable, more convertible, and easier by using this invention. Power supplies can be swapped out for units that are broken. They can be swapped out for units that need a different energy source. They can even be swapped out if more precision, or more or less power is needed. As such, the invention greatly advances the technology of the packaging industry.

Although the invention has been shown and described with respect to a certain embodiment or embodiments, it is apparent that this invention can be embodied in many different forms and that many other modifications and variations are possible without departing from the spirit and scope of this invention.

Moreover, any of the features or attributes of the above described embodiments and variations can be used in combination with any of the other features and attributes of the above described embodiments and variations as desired.

Furthermore, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. An externally-powered strapping tool, comprising:

a strapping tool assembly configured to perform one or more strapping operations, said strapping tool assembly including a housing portion having a bottom surface, said strapping tool assembly further including a power transfer subassembly with a shaft portion, said strapping tool assembly additionally including a tensioner shaft, a tensioning member, and a pivotal foot subassembly, said tensioner shaft being operatively coupled to said shaft portion of said power transfer subassembly, said tensioner shaft being coupled to said tensioning member for tensioning a strap, and said housing portion of said strapping tool assembly further including a side cap member for holding said tensioning member and said pivotal foot subassembly in place, said tensioning member and said pivotal foot subassembly being disposed on an interior side of said side cap member, said one or more strapping operations performed by said strapping tool assembly including tensioning plastic, steel, or cord strappings; and an external power source operatively coupled to said strapping tool assembly, said external power source including a power generation portion and a first handle portion extending from said power generation portion, said first handle portion of said external power source being configured to function as a support handle for a user performing said one or more strapping operations with said strapping tool assembly, said power generation portion of said external power source including a drive component, said drive component being coupled to said shaft portion of said power transfer subassembly, and said external power source comprising a battery powered electric drill.

2. The externally-powered strapping tool according to claim 1, wherein the pivotal foot subassembly comprises a foot member and a second handle portion, said foot member configured to hold down said strap during the tensioning of said strap.

3. The externally-powered strapping tool according to claim 1, wherein said external power source is capable of being selectively engaged with, and disengaged from, said strapping tool assembly.

4. The externally-powered strapping tool according to claim 1, wherein said first handle portion of said external power source extends in a cantilevered manner from said power generation portion above said strapping tool assembly, and said first handle portion extends generally perpendicularly from said power generation portion.

5. The externally-powered strapping tool according to claim 1, wherein said external power source is configured to accommodate electronic controls for regulating the operation and/or sequencing and/or speed of tasks performed by said strapping tool assembly.

6. The externally-powered strapping tool according to claim 1, wherein said one or more strapping operations performed by said strapping tool assembly further comprise one of the following: (i) sealing and/or welding plastic, steel, or cord strapping; and (ii) both tensioning and sealing and/or welding plastic, steel, or cord strapping.

7. The externally-powered strapping tool according to claim 1, wherein said tensioning member comprises an internally disposed grip wheel for tensioning said strap, said tensioner shaft configured to rotate with said grip wheel.

8. The externally-powered strapping tool according to claim 7, wherein said housing portion further comprises a gear case member, said internally disposed grip wheel being disposed between said gear case member and said side cap member.

9. The externally-powered strapping tool according to claim 1, wherein said external power source further comprises a battery pack, said first handle portion of said external power source being disposed between said power generation portion and said battery pack.

10. The externally-powered strapping tool according to claim 9, wherein said battery pack has a cross-sectional area that is larger than a cross-sectional area of said first handle portion of said external power source.

* * * * *